US012758874B2

(12) United States Patent
Nelson et al.

(10) Patent No.: US 12,758,874 B2
(45) Date of Patent: Oct. 13, 2026

(54) CREATING AND DELIVERING VIRTUAL CONTENT FOR GAMING OBJECTS BASED ON PLAYER GROUP CONTENT PREFERENCES

(71) Applicant: IGT, Las Vegas, NV (US)

(72) Inventors: Dwayne Nelson, Las Vegas, NV (US); Jackie Alvarez, Las Vegas, NV (US)

(73) Assignee: IGT, Las Vegas, NV (US)

( * ) Notice: Subject to any disclaimer, the term of this patent is extended or adjusted under 35 U.S.C. 154(b) by 220 days.

(21) Appl. No.: 18/631,527

(22) Filed: Apr. 10, 2024

(65) Prior Publication Data

US 2025/0319394 A1 Oct. 16, 2025

(51) Int. Cl.

| | |
|---|---|
| ***A63F 13/52*** | (2014.01) |
| ***A63F 13/285*** | (2014.01) |
| ***A63F 13/65*** | (2014.01) |
| ***A63F 13/73*** | (2014.01) |
| ***A63F 13/75*** | (2014.01) |
| ***A63F 13/79*** | (2014.01) |

(52) U.S. Cl.

CPC ............ *A63F 13/52* (2014.09); *A63F 13/285* (2014.09); *A63F 13/65* (2014.09); *A63F 13/73* (2014.09); *A63F 13/75* (2014.09); *A63F 13/79* (2014.09); *A63F 2300/8082* (2013.01)

(58) Field of Classification Search

CPC ........ A63F 13/52; A63F 13/285; A63F 13/65; A63F 13/73; A63F 13/75; A63F 13/79; A63F 2300/8082

See application file for complete search history.

(56) References Cited

U.S. PATENT DOCUMENTS

| | | | | |
|---|---|---|---|---|
| 8,147,334 | B2 | 4/2012 | Gatto et al. | |
| 8,579,710 | B2 | 11/2013 | Watkins, Jr. et al. | |
| 8,668,592 | B2 * | 3/2014 | Watkins, Jr. ............ | A63F 13/47 463/43 |
| 8,764,566 | B2 | 7/2014 | Miltenberger et al. | |
| 8,777,746 | B2 | 7/2014 | Watkins, Jr. et al. | |
| 8,821,296 | B1 | 9/2014 | Smurfit et al. | |
| 8,882,595 | B2 | 11/2014 | Chowdhary et al. | |
| 8,903,132 | B2 | 12/2014 | Watkins, Jr. et al. | |

(Continued)

OTHER PUBLICATIONS

U.S. Appl. No. 18/442,481, filed Feb. 15, 2024.
U.S. Appl. No. 18/793,015, filed Aug. 2, 2024.
"DALL-E," Wikipedia, Updated Dec. 29, 2023, 13 pages [retrieved online May 22, 2024 from: en.wikipedia.org/w/index.php?title=DALL-E&oldid=1192428517].

(Continued)

*Primary Examiner* — Thomas H Henry
(74) *Attorney, Agent, or Firm* — Sheridan Ross P.C.

(57) ABSTRACT

The present disclosure relates generally to a gaming system, device, and method that in response to the detected content generation event, generates, from a set of group content preferences, content for presentation by a reality altering device of each player in the group of players, select content in the generated content for presentation by the reality altering device to represent a sensory characteristic of a selected object in a set of objects, determines, relative to a coordinate system, a respective spatial location of each player in the group of players and a respective spatial location of the selected object, and, based on the respective spatial locations of each player relative to the respective spatial location of the selected object, causes a respective portion of the selected content to be presented by the corresponding reality altering device of the player.

20 Claims, 8 Drawing Sheets

(56) References Cited

U.S. PATENT DOCUMENTS

| | | | |
|---|---|---|---|
| 8,944,910 B1 | 2/2015 | Boyle | |
| 9,144,739 B2 | 9/2015 | Wilkinson et al. | |
| 9,545,563 B2 | 1/2017 | Yim et al. | |
| 10,735,815 B1 | 8/2020 | Zhan | |
| 10,946,284 B2 | 3/2021 | Chowdhary et al. | |
| 10,997,761 B2 | 5/2021 | Guzman | |
| 11,890,536 B2 | 2/2024 | McCoy et al. | |
| 2014/0179427 A1 | 6/2014 | Miura et al. | |
| 2014/0179439 A1 | 6/2014 | Miura et al. | |
| 2018/0280802 A1 | 10/2018 | Stroud | |
| 2019/0240586 A1 | 8/2019 | Taylor et al. | |
| 2019/0246179 A1 | 8/2019 | Taylor et al. | |
| 2019/0370637 A1 | 12/2019 | Dunning et al. | |
| 2020/0074707 A1 | 3/2020 | Lee et al. | |
| 2020/0090043 A1 | 3/2020 | Mnih et al. | |
| 2020/0151087 A1 | 5/2020 | Capello et al. | |
| 2020/0184225 A1 | 6/2020 | Mulligan | |
| 2020/0289943 A1 | 9/2020 | Rico | |
| 2020/0298118 A1 | 9/2020 | Yannakakis | |
| 2020/0298128 A1 | 9/2020 | Yannakakis | |
| 2020/0306641 A1 | 10/2020 | Kolen | |
| 2021/0001216 A1 | 1/2021 | Sanders | |
| 2021/0072981 A1 | 3/2021 | Duan | |
| 2021/0086089 A1 | 3/2021 | Pardeshi | |
| 2021/0093969 A1 | 4/2021 | McCoy | |
| 2021/0178258 A1* | 6/2021 | McCoy | A63F 13/428 |
| 2021/0287118 A1 | 9/2021 | Pierce | |
| 2021/0331072 A1 | 10/2021 | Gibbon | |
| 2021/0374098 A1 | 12/2021 | Holmdahl | |
| 2021/0390778 A1 | 12/2021 | Kim | |
| 2021/0394060 A1 | 12/2021 | Yilmazcoban | |
| 2022/0008824 A1 | 1/2022 | Kothari | |
| 2022/0126208 A1 | 4/2022 | Salakka et al. | |
| 2022/0168640 A1 | 6/2022 | Ida | |
| 2024/0177441 A1 | 5/2024 | Benzies | |
| 2024/0355065 A1 | 10/2024 | Miller et al. | |
| 2024/0362968 A1 | 10/2024 | Lyons et al. | |
| 2024/0424405 A1* | 12/2024 | Rao | A63F 13/67 |
| 2025/0256208 A1 | 8/2025 | Nelson | |
| 2025/0259505 A1 | 8/2025 | Nelson et al. | |
| 2025/0281839 A1 | 9/2025 | Nelson et al. | |

OTHER PUBLICATIONS

"Generative AI Models Explained," Data Science, Oct. 12, 2022, 28 pages [retrieved online May 22, 2024 from: www.altexsoft.com/blog/generative-ai/].

Jacon "Image Generative AI: A Beginner's Guide," Medium, Jul. 24, 2023, 11 pages [retrieved online Jan. 8, 2024 from: medium.com/@taynarajacon/image-generative-ai-a-beginners-guide-8e3563b8e2ed].

O'Connor "How DALL-E 2 Actually Works," Assembly AI, Sep. 29, 2023, 32 pages [retrieved online May 22, 2024 from: www.assemblyai.com/blog/how-dall-e-2-actually-works/].

U/selayilly "What is generative AI and how does it work?" Reddit, Oct. 2023, r/generativeAI, 6 pages [retrieved online May 22, 2024 from: www.reddit.com/r/generativeAI/comments/176kisw/what_is_generative_ai_and_how_does_it_wo rk/].

"Augmented reality," Wikipedia, last edited Feb. 27, 2024, 48 pages [retrieved online Feb. 28, 2024 from: en.wikipedia.org/w/index.php?title=Augmented_reality&oldid=1210598682].

"Online casino," Wikipedia, last edited Oct. 7, 2023, 8 pages [retrieved online Feb. 16, 2024 from: en.wikipedia.org/w/index.php?title=Online_casino&oldid=1178993090].

"Online Casinos vs Traditional Land-Based Casinos," servers.com, 2023, 4 pages [retrieved online Feb. 16, 2024 from: www.servers.com/news/blog/what-is-the-difference-between-land-based-and-online-casinos].

"Understanding virtual reality and augmented reality," GCFGlobal, 2020, 5 pages [retrieved online Jun. 12, 2024 from: edu.gcfglobal.org/en/thenow/understanding-virtual-reality-and-augmented-reality/1/].

"Virtual reality," Wikipedia, last updated Feb. 22, 2024, 29 pages [retrieved online Feb. 28, 2024 from: en.wikipedia.org/wiki/Virtual_reality].

"Virtual Reality, the technology of the future," Iberdrola, 2020, 3 pages [retrieved online Feb. 28, 2024 from: www.iberdrola.com/innovation/virtual-reality].

"What is a Virtual Reality Casino and How Does It Work?" BetMGM, TheRoar, Dec. 4, 2023, 10 pages.

Dhaya "Improved Image Processing Techniques for User Immersion Problem Alleviation in Virtual Reality Environments," Journal of Innovative Image Processing (JIIP), 2020, vol. 02, No. 2, pp. 77-84.

* cited by examiner

CREATING AND DELIVERING VIRTUAL CONTENT FOR GAMING OBJECTS BASED ON PLAYER GROUP CONTENT PREFERENCES

BACKGROUND

The present disclosure is generally directed towards gaming devices and systems and, more specifically, gaming devices and systems creating and delivering virtual content for gaming objects in augmented, virtual, and mixed reality gaming applications.

Casino models have employed augmented and virtual reality in video gaming systems. Video simulation is growing in popularity, particularly with multiple users or players.

BRIEF SUMMARY

In certain aspects, the present disclosure relates to a gaming system, device, and method supportive of self-evolving, AI-based content generative models.

In an aspect, a system includes a communication interface, a processor coupled with the communication interface, and a computer-readable storage medium coupled with the processor.

The computer readable storage medium stores a set of instructions thereon that enables the processor to:

detect a content generation event;

determine a set of group content preferences based on different sets of content preferences associated with different players in a group of players;

in response to the detected content generation event, generate, from at least part of the set of group content preferences, content for presentation by a reality altering device of each player in the group of players;

select content in the generated content for presentation by the reality altering device of each player in the group of players to represent a sensory characteristic of a selected object in a set of objects, each reality altering device being in communication with the communication interface;

determine, relative to a coordinate system, a respective spatial location of each player in the group of players and a respective spatial location of the selected object; and based on the respective spatial locations of each player in the group of players relative to the respective spatial location of the selected object, cause at least a respective portion of the selected content to be presented by a corresponding reality altering device of the player.

In an aspect, a method includes the steps of:

detecting, by a processor, a content generation event;

determining, by the processor, a set of group content preferences based on different sets of content preferences associated with different players in a group of players;

in response to the detected content generation event, generating, by the processor from at least part of the set of group content preferences, content for presentation by a reality altering device of each player in the group of players;

selecting, by the processor, content in the generated content for presentation by each reality altering device of the group of players to represent a sensory characteristic of a selected object in a set of objects;

determining, by the processor relative to a three-dimensional coordinate system, a respective spatial location of each player in the group of players and a respective spatial location of the selected object; and based on the respective spatial locations of each player in the group of players relative to the respective spatial location of the selected object, causing, by the processor, at least a respective portion of the selected content to be presented by a corresponding reality altering device of the player.

In an aspect, a method includes the steps of:

detecting, by a processor, a content generation event;

determining, by the processor, a set of group content preferences based on different sets of content preferences associated with different players in a group of players;

in response to the detected content generation event, generating, by the processor from at least part of the set of group content preferences, a prompt to a generative model;

providing, by the processor, a content generation request comprising the prompt to the generative model;

in response to the content generation request, receiving, by the processor, generated content generated by the generative model;

determining, by the processor relative to a three-dimensional coordinate system, a respective spatial location of each player in the group of players and a respective spatial location of a selected virtual object in a set of virtual objects; and based on the respective spatial locations of each player in the group of players relative to the respective spatial location of the selected virtual object, causing, by the processor, at least a portion of the generated content to be presented by one of an augmented reality and virtual reality output device to represent a sensory characteristic of the selected object.

Additional features and advantages are described herein and will be apparent from the following Description and the figures.

DETAILED DESCRIPTION

Figure 1:
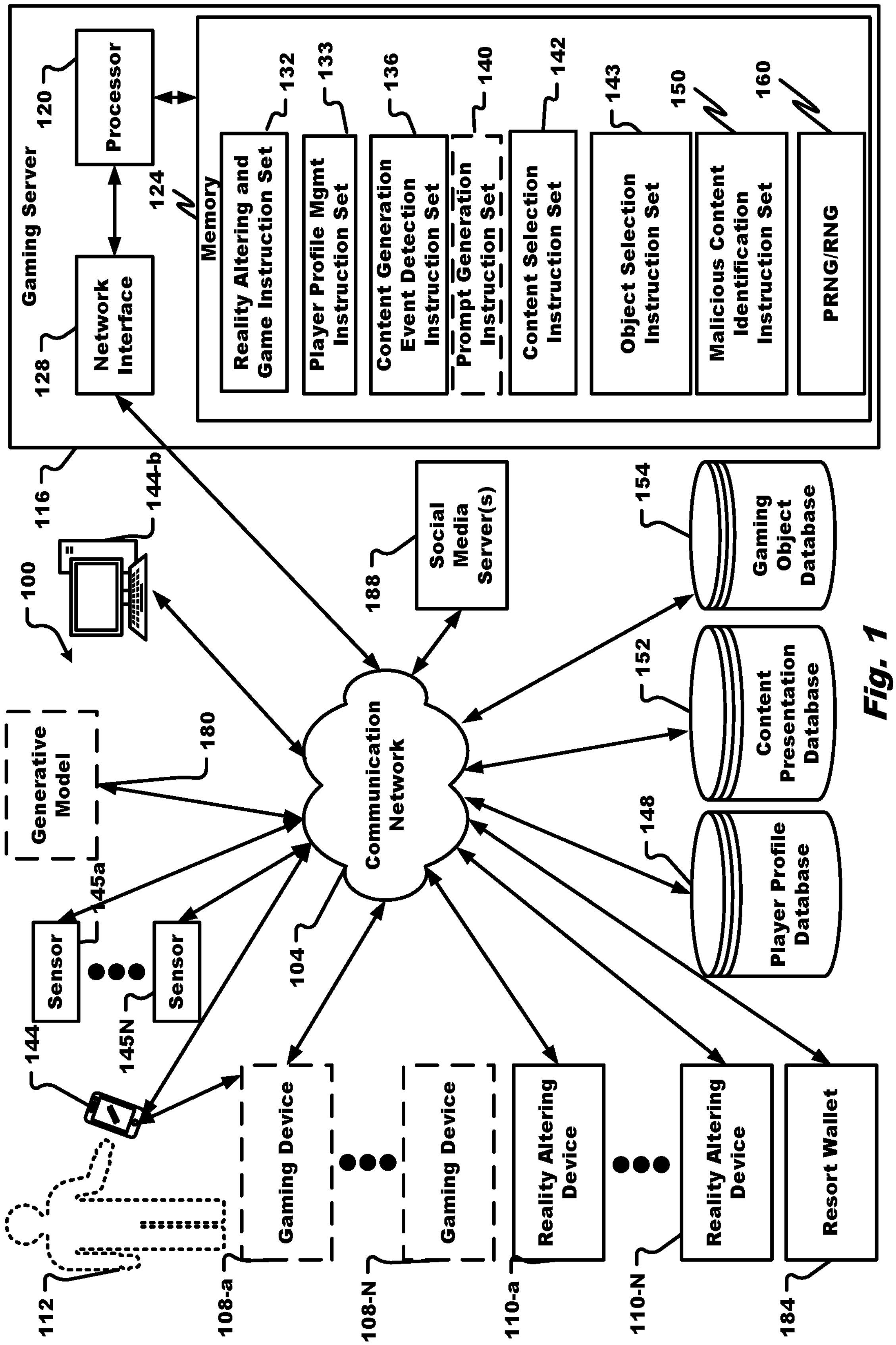
FIG. 1 is a block diagram of a gaming system in accordance with aspects of the present disclosure.

Aspects of the present disclosure will be described in connection with video gaming that can include a reality altering gaming model (e.g., augmented, simulated, mixed, extended, or computer-mediated reality) in an environment such as, for example, a casino environment. The reality-altering gaming model can use one or more self-evolving, artificial intelligence (AI)-based models (also referred to as self-learning, AI-based augmented, simulation, or mixed reality models), such as a rule-based or AI or machine learning (ML) model(s), that render selected content to alter or replace one or more sensory characteristics of gaming objects. The sensory characteristic can, for example, include a visual appearance, an auditory sound, haptic feedback, somatosensory sensation, and/or olfactory smell. While some examples in the present disclosure may reference the use of an Electronic Gaming Machine (EGM) and/or reality-altering devices as a gaming device via which players may participate in gaming activity, it should be appreciated that aspects of the present disclosure are not so limited. For example, any computing device, personal gaming device, or collection of computing devices may be used to facilitate creating and rendering virtual objects for player viewing during a gaming session.

As will be appreciated, augmented reality (AR) and mixed reality (MR) combine both real world and computer-generated content, or use a set of objects that includes real objects optionally combined with one or more virtual objects. In some applications, AR incorporates a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment.

Virtual reality (VR), by contrast, replaces real world content with computer-generated content, or uses a set of objects that includes only virtual objects. In some applications, VR incorporates a virtual world, real-time interaction, and accurate 3D registration of virtual objects. The overlaid sensory information is generally destructive (i.e. masking of the natural environment). In this way. VR completely replaces the user's real-world environment with a simulated one while AR alters one's ongoing perception of a real-world environment. AR thus differs from VR in that the AR part of the surrounding environment is "real" and AR is simply adding layers of virtual objects to the real environment. On the other hand, in VR the surrounding environment is completely virtual and computer generated. For example, VR can be used to an immersive gaming environment inside an empty room while AR can be used to create an immersive gaming environment in a room with EGMs in which immersive content is super-imposed on the EGM cabinets.

Although a gaming server of the gaming system typically itself hosts or is in communication with a host of an augmented, simulated, or mixed reality gaming model, the gaming system can use a virtual EGM, game or application a real EGM, or other component of the gaming system (i.e., gaming system component) to create the impression that virtual objects are generated by that component of the gaming system. The gaming system can use a self-evolving, artificial intelligence (AI)-based model (also referred to as self-learning, AI-based content models such as generative models), such as a rule-based or AI or machine learning (ML) model, that generates new content for rendering virtual objects to create the impression that the gaming system has a unique personality catered to the player or player group. While the reality altering or content generation model can be executed completely on an EGM, it is typically hosted on the gaming system or a server external to the gaming network. Using a gaming system or external server as a host can allow the augmented, simulated, or mixed reality gaming model to work across different gaming device manufacturers and even across product types.

In an exemplary embodiment, the gaming system detects a content generation event, determines a set of player group content preferences based on different sets of content preferences associated with different players in a group of players, and, in response to the detected content generation event, generates, from at least part of the set of group content preferences, content for presentation by a reality altering device, such as a wearable reality altering device of each player in the group of players, selects content in the generated content for presentation by the reality altering device of each player in the group of players to represent a sensory characteristic of a selected object in a set of objects, determines, relative to a (typically three-dimensional) coordinate system, a respective spatial location of each player in the group of players and a respective spatial location of the selected object, and, based on the respective spatial locations of each player in the group of players relative to the respective spatial location of the selected object, causes at least a respective portion of the selected content to be presented by a corresponding reality altering device of the player.

The reality altering device can be any device that renders augmented, virtual, or mixed reality content. The reality altering device typically comprises a processor, display, sensor to sense a location or activity of a corresponding player, and input device. Exemplary reality devices include a digital projector, desktop computer, laptop computer, tablet computer, smart phone, head-mounted display (HMD), head-up display (HUD), eyeglasses, contact lenses, virtual retinal display (VRI), EyeTap, handheld display, among other devices.

The reality altering devices can provide a gaming experience for each player in the group of players using common or different set of objects to provide concurrently the same or different immersive environments. In the former application, the reality altering model can render a common object in spatial proximity to the group of players with common selected content but different objects in spatial proximity to the group of players with different selected content. In the latter application, the set of objects used to create an immersive environment for each player can use both common and different objects. For example, the reality altering model, based on the respective locations of first and second players in the group of players relative to the respective spatial location of a selected object and using common selected content based on a common content preference, can cause a first respective portion of the selected content to be presented by a first wearable reality altering device of the first player and a different second respective portion of the selected content to be presented by a second wearable reality-altering device of the second player. In another example, the model, based on the different first and second content preferences of first and second players of the group of players and using different selected content, causes a first respective portion of first selected content to be presented by a first reality altering device of the first player and a different second respective portion of second selected content to be presented by a second reality altering device of the second player. The first and second respective portions of the selected content can be related to a common game theme.

The first and second players can receive common and different selected content depending on their conflicting individual preferences (e.g., likes and dislikes). In other words, the first player would have a first immersive experience and the second player a different second immersive experience with the first and second immersive experiences using common content for a first set of virtual objects and different content for a disjoint second set of virtual objects.

In some applications, the reality altering model, based on the respective spatial locations of first and second players in the group of players relative to the respective spatial locations of different first and second selected objects, causes first selected content to be presented by first and second reality altering devices of the first and second players, respectively, for the first selected object, monitors behavior of the first and second players in response to presentation of the first selected content, and based on monitored behavior, selects and causes second selected content to be presented by the first and second reality altering devices of the first and second players, respectively, for the second selected object.

The set of objects used in creating the immersive environment can include a virtual character, player character, a non-player character, an animate or inanimate virtual object, and other types of objects contextually relevant to a game or gaming session. A "virtual character" may include a persona created by a player or chosen from a list in the virtual world. Typically, virtual characters are modeled after humans whether living, historical, or fantasy (e.g. characters from mythology). A "player character" or "playable character" (PC) is a virtual character in a virtual world that is controlled or controllable by a player. A player character is a persona of the player who controls it A "non-player character" (NPC) is a virtual character that is controlled by the model and not a player. NPC may also refer to other entities not under the direct control of players. NPC behavior in a virtual world may be scripted and automatic. The virtual character can be in the form of an avatar. An "avatar" relates generally to the physical embodiment of a virtual character in the virtual world. Examples of animate and inanimate objects include a gaming machine (e.g., an EGM), a table game (e.g., an electronic table game), a gaming object (e.g., dice, cards, or roulette ball), chips, currency, an animal, bird, fish or reptile and the like. The types of objects selected for a particular gaming session can be based on player content preferences, game theme, or a combination thereof. Object placement relative to the coordinate system can be selected to optimize player access to certain areas, such as areas containing real or virtual gaming devices, while prohibiting access to other areas, such as walls, stairs or tripping hazards. When over occupancy issues arise, the access areas can be enlarged to encourage players to spread out.

In some applications, modifications of object characteristics to reflect selected content are phased in over time based on responsive player behavior rather than all at once based on a predetermined hierarchy. In other words, at a first time interval characteristics of a first set of objects are modified by first selected content based on first content preferences, the responsive player is observed, when the responsive player behavior is a first target behavior, at a later second time interval characteristics of a different second set of objects are modified by the first and/or second selected content, the responsive player behavior is again observed, when the responsive player behavior is a second target behavior, at a later third time interval characteristics of a different third set of objects are modified by the first, second, and/or third selected content, and so forth. By way of illustration, at a first time virtual trees grow up from a selected area of the floor based on a forest content preference shared by a group of players, in response to the players moving towards the selected floor area, virtual grass grows up from the floor with a dirt trail extending into the selected floor area, and in response to more members of the group of players move towards the selected floor area, virtual rocks appear on the walls surrounding the selected floor area to complete the nature scene.

When the player is part of a group of players, the generation of the set of content preferences can include determining a set of group content preferences based on different sets of individual player content preferences associated with different players in the group of players, with at least part of the set of group content preferences being included in the sensory characteristic. For example, the sensory characteristic can include one or more of a content preference associated by a player profile with a player of the group of players, a content preference associated with a social website posting of a player of the group of players, a content preference received from a mobile device of a player of the group of players, a game theme associated with a game, a player activity detected by the gaming system, input received from a player of the group of players, a captured image of a player of the group of players, a loyalty level of a player of the group of players, and a loyalty point balance of a player of the group of players.

Player eligibility to receive generated content modification of AR or VR objects can be determined in a number of ways. In some embodiments, the player must be authenticated successfully by the gaming system for the content preferences of the player to be considered in content generation. Authentication can be done by any suitable authentication techniques, such as single use passwords or passcodes, digital certificate, image recognition based on gaming system camera still or video images, and other knowledge-based, physiological biometrics-based, behavioral biometrics-based, and two/multi-factor authentication techniques. In some embodiments, the player is not able to participate in a gaming session using generated content and/or content preferences in content generation without the player's prior consent.

The detected content generation (or trigger) event can include one or more of: successful authentication of a player of the group of players by the gaming system, detection of a location of a mobile device associated with a player of the group of players, detection of at least a threshold level of gameplay by a player of the group of players, occurrence of a predetermined state of the gaming system, occurrence of a predetermined player loyalty activity by the gaming system, detection that gameplay on another gaming device currently presenting different selected content is below a threshold level of gameplay, detection that a presentation duration of the different selected content is at least a threshold duration, detection of a new content preference associated with a player of the group of players occurrence of a predetermined random or pseudorandom number, occurrence of at least a threshold loyalty point balance or loyalty status associated with a player of the group of players, occurrence of a predetermined clock value, entrance of a player or player(s) of the group players into a defined area of the gaming system, occupancy of at least a threshold number of players of the group players in the defined area of the gaming system, and departure of a player or player(s) of the group players from the defined area of the gaming system.

In some embodiments, the content generation (or trigger) event is based or contingent upon a number of factors including a state of the gaming system, a state of a gaming session with the player, and/or current and/or historic player behavior data. The state of the gaming session can be based on observed real-time gameplay data of the player during a concurrent gaming session (considering factors such as game outcome, game theme, speed of play, cash in amount, cash out amount, play session length, additional in-session cash in amounts, wager behavior (e.g., change of wager behavior, average wager amount, Min/Max wager amount, wager to win correlation, number of lines played, denomination selected, side bet features activated/deactivated, and playing double-up or similar features and other metrics of wager behavior), wagering speed, idle time, etc. The state of the gaming system can be based on the collective gameplay and configuration data for multiple gaming sessions, including the gameplay and configuration data associated only with the particular gaming session.

In some embodiments, the content generation (or trigger) event for a particular session state is based on one or more of a credit amount at the start of a gameplay session (e.g., 'SumCashInAmount'), a credit amount at the end of a prior gameplay session (e.g., 'SumCashOutAmount'), quantity of wager adjustments during a temporal period and/or during a gameplay session (e.g., 'No. of bet changes'), a ratio of a wager amount to a player bankroll (e.g., 'Wager-Bank-Ratio'), gameplay duration associated with gameplay session (e.g., 'TimePlayed'), average wager amount for a primary game (base game) (e.g., 'AverageWagerPrimary'), an average win amount associated with a primary game (e.g., 'AveragePrimaryWinAmount'), quantity of primary games played during a temporal period and/or during a gameplay session (e.g., 'No.PrimaryGamesPlayed'), quantity of secondary games (bonus games) played during a temporal period and/or during a gameplay session (e.g., 'No.SecondaryGamesPlayed), and the like.

In some aspects, the gameplay data may be data (e.g., gameplay data, sensor data, etc.) collected directly via a gaming device associated with a player and a gameplay session. The data may be collected via a central game management system, a player tracking system, a casino management system, a controller/data aggregator (e.g., iLink-type device), or the like. The tracked inputs may include active inputs (e.g., a gameplay decision, a button press, a handle pull, etc.) and/or passive inputs (e.g., a measured biometric parameter) In some examples, the gaming device may track and forward gameplay results (e.g., resulting game outcomes).

When content is autogenerated by a generative model, the prompt typically comprises a content preference associated by player profile(s) with a player or one or more players in the group of players, content preference(s) associated with a social website posting of the player or one or more players in the group of players, content preference(s) received from a mobile device of a player of the group of players, a game theme associated with the plurality of gaming devices, a player activity detected by the gaming system, input received from the player or one or more players in the group of players, captured image(s) of the player or one or more players in the group of players, loyalty level(s) of the player or one or more players in the group of players, and loyalty point balance(s) of the player or one or more players in the group of players. In some embodiments, the selection of the content preferences to be used in the prompt can be based at least in part on player input.

To conserve processing resources and decrease processing latency associated with gaming, the gaming system can map a content preference associated with the content generation event against previously selected content and associated gameplay performance levels to determine whether to provide reuse the selected content in lieu of using new content. In other words, a set of content preferences for one or more players may have been used in a prior content selection operation, and the gaming system, using historical information, can use the same rationale employed previously and quickly select the content for reuse. In some embodiments, the analysis considers the historical outcome from using the content and selects the prior content when the outcome was desirable. When the outcome was undesirable, the gaming system selects a different set of preferences associated with the player or group of players for the content or different content having a determined level of relatedness to the selected preferences but having a different and more desirable outcome. The mapping can be done efficiently by mapping a content ID against an outcome ID. The ID can be a hash, pixel comparison, or other summary or description of the corresponding prompt or content, respectively, to decrease mapping latency.

The content preference and content can comprise one or more of a text, image, music, audio, color, style, animation, and video information. The content can include a plurality of discrete content recommendations from which the gaming system selects the content for presentation by one or more gaming devices. The selection can be based on one or more parameters, including relatedness of the selected received content to a current game theme of the gaming device, an outcome of using similar content for an object in a prior gaming session, a rule set of the gaming system setting forth desirable and undesirable content for the object, type of game, relatedness of the selected content to existing content of other objects of the gaming device that are to be used concurrently with the selected received content, and the like. As will be appreciated, a game theme can be any genre, storyline, or basis of a game or game type. Examples include a movie or TV program such as Lord of the Rings™, Stranger Things™, James Bond™, Willy Wonka™, and Game of Thrones™, a gameshow such as Wheel of Fortune™, The Price is Right™, Pyramid™, Let's Make a Deal™ or Jeopardy™, a historical event or person such as historical events including Romans. Egyptians. Cowboys and the Amazon and historical or living persons including Caesar, Cleopatra, John Wayne, and other genres, storylines, or game bases that are compatible with games and/or attractive to players.

The gaming system can improve content and object selection outcomes by tracking historical behaviors. In one embodiment, the gaming system associates a game or session identifier associated with a game played by the player on the gaming device while the received content is presented by the gaming device to the player and gameplay information associated with the played game with a content identifier and object identifier associated with the at least a portion of the selected content. The association can include an outcome description indicating whether or not the content and associated content modified object produced a desirable or undesirable outcome for the gaming system and players. The outcome for instance can indicate a level of gameplay of and/or wagering one or more players while the content is rendered, a level of popularity of the game as modified by the content, a level of occupancy of gaming devices providing the game modified by the content, other gameplay or loyalty information, and the like.

In some embodiments, the outcome is based on a number of factors, including for example player input on the appropriateness of the selected content, an actual behavior of the player identified as being in response to the selected content and object pairing, and a difference between a target player behavior associated with the selected content and the actual behavior of the player in response thereto. The target behavior can be selected based on a variety of criteria, including the physical location, type, and state of the gaming system. The target and actual behaviors can relate, for example, to an action of the player performed within a defined time interval of the gaming system rendering generated content to a player.

The player preference can be considered individually or as part of a set of player group content preferences. The gaming system can determine the set of group content preferences by weighting a first set of content preferences of a first player of the group of players more than a second set of content preferences of a second player of the group of players. The weighting of a particular set of player preferences can be, for example, one or more of: an amount a player has played over a period of time, an amount a player has won over a period of time, a recent game event at the gaming system involving a player in the group (such as a game outcome in which the player has won such as a jackpot and other award (e.g., bonuses, free spins, etc.)), an amount of time the player has been in the area or been playing, a game theme the player is playing, a wager amount associated with the player, a domination played by the player, a player loyalty account or the status of that account, a number of player loyalty points in the account, a rank of the player (e.g., platinum, gold or silver), an amount of player loyalty points or money spent by the player over a determined time period (e.g., the player spends points to be chosen/included in the AI generation), a player selected randomly based on a RNG or PNRG output, a predetermined permissible or impermissible player preference, a number of times the player has been at the gaming system property within the last n (casino defined) days, and whether the player has spent > or =n (casino defined) number of dollars within the last n (casino defined) days. Other selection techniques include without limitation popularity of a content preference in the sets of content preferences of the players in the group of players, a relatedness of a content preference to an assigned game theme of the gaming devices played by the group of players, and the like.

In some applications, the gaming system, in response to detecting a content generation event, uses the set of player group content preferences to generate a prompt to a generative model; provides a content generation request comprising the prompt to the generative model; in response to the content generation request, receives content generated by the generative model; selects at least a portion of the received content for presentation by one or more reality altering devices; and causes the received content to be presented by the reality altering device(s) to one or more eligible players. In some applications, the prompt and sensory characteristic each include one or more of text, an image, music, audio, and video information. The generative model can be any type of content generative model and typically includes a prompt encoder trained to map the prompt to a representation space and an image decoder that stochastically generates an image representing the representation space. Common generative models include one of a variational autoencoder (VAE), generative adversarial network (GAN), autoregressive model, diffusion model, and transformer-based model. Neural networks used in generative models include recurrent neural networks (NNs) and convoluted neural networks (CNNs). Examples of generative models include DALL-ETM and MIDJOURNEY™.

The generated image can be presented by the reality altering model before or during a gaming session with the player. The gaming system can select an object (real or virtual) from among a set of plural objects to be modified by the received content. The selection can be based on one or more parameters, including relatedness of the selected received content to a current game theme, an outcome of using similar content for a selected object in a prior gaming session, a rule set of the gaming system setting forth desirable and undesirable content, type of game, relatedness of the selected content to existing content of other objects of the gaming device that are to be used concurrently with the selected received content, and the like. Exemplary object selection and rendering operations include using selected content to render an altered exterior appearance of a physical EGM cabinet, an altered appearance of floor, carpet, walls, ceiling, furnishings, and lighting in a brick-and-mortar casino, an image of a virtual gaming device such as an EGM, an image of a player character or nonplayer character (such as a dealer), an image of an inanimate object such as a car, plant or terrain feature in the gaming area, and an image of an avatar representing a nonhuman character such as an animal, bird, fish or reptile moving through a gaming area.

The content and object selection and objects can be performed by an AI model, such as a machine learning model or data set that is useable in a neural network and that has been trained by one or more data sets that describe, for a selected content preference, the associated selected generated content and object pairings and the associated outcome. The model(s) may be stored as a model data file or any other data structure that is usable within a neural network or an AI system. In addition to a data set that describes selected content preferences and/or resulting generated content and selected generated content and object pairings and associated outcome, the model may be trained using gameplay data, player information, and other gaming system state information.

In one embodiment, the gaming system has a single AI-enabled model for all types of gaming devices, games, and/or players while in other embodiments a unique model is maintained for each gaming device type, game type, or player group. One or more models can be concurrently assigned to one or more gaming sessions. The model(s) can receive gameplay data of multiple gaming sessions of multiple different players on different gaming devices and/or configuration data associated with each of the gaming devices.

The AI-enabled models can make a real-time determination of which selected content and which object pairing has the highest likelihood of producing a desired or target player behavior by using not only general information relating to the gaming system state but also real-time and historic gameplay data of one or more players, including the player in question. AI can observe and compare in real time one or more players' behaviors and the respective revenues realized by the players as a function of time-which cannot be done mentally.

To avoid using potentially sensitive information of a player as a player content preference in content and/or object selection, the gaming system can require prior player approval before a player content preference is used. In addition, the gaming system can be restricted from using sensitive information of the player by including sensitivity tags or other metadata in sensitive fields of the player's profile The various model(s) can induce an illusion of gaming system familiarity and awareness of the player's needs, desires, and activities, which can enhance player trust in the gaming system and player satisfaction, increase player engagement, and enable gaming systems operators to have higher levels of floor (e.g., casino gaming device) utilization by selecting EGMs in less occupied areas of the floor for modification by rendering selected content. The gaming system can increase player engagement and trust of the gaming system by allowing a player to engage with a gaming device providing content customized to the player's preferences. By way of illustration, the player feels that he/she is communicating directly with a customized and personalized gaming system component even though the gaming device is actually receiving content from a server hosting the reality altering gaming model.

In gaming systems, security is a paramount concern. Introduction of new technologies in a gaming system can render new vulnerabilities for malware and other malicious content. To maintain gaming system security, the gaming system can employ multiple levels of security monitoring. For example, the selected player preference and/or prompt provided to the generative model can be parsed to identify malicious content, particularly when the prompt or content comprises user inputted preferences. The gaming system can further parse generated or selected content to identify malicious content.

Malicious content in player content preferences, the prompt itself, selected content can take many forms, including one or more of a quick response ("QR") code, malware, a malformed image file, and content violating a game rule. An example of the former is a QR code incorporated in a player provided image that directs a different player to a website represented by the QR code. The website can be used to collect sensitive player information that may be employed for identity theft, unlawful access to a gaming system account of the player, an advertising page of a competitor, a page providing negative advertising regarding the gaming system, and the like. Examples of malware include viruses, worms, Trojan viruses, spyware, adware, and ransomware. An example of a malformed image file is an image file that violates a set of gaming device image display rules, such as an incorrect image size, style, pixel dimension, pixel resolution, format, or other parameter of an image, a wrong number of layers, or an inconsistent color set, etc. An example of content violating a game rule is content that itself violates a game rule creating player confusion or induces player behavior that violates a game rule. By way of illustration, the prompt could include a player preference regarding a description of an image that resembles an image of a wild symbol, scatter symbol, and/or multiplier symbol that causes the generative model to generate content that is confusingly similar to the symbol type, thereby causing player confusion.

In some gaming environments (e.g., casino environments), an EGM may include a conventional intelligent agent (e.g., a gameplay assistant, a gameplay model, a player companion, etc.) which, when activated during a gameplay session at the EGM, may assist the player and/or server as a personalization enabler. However, in some other implementations of conventional intelligent agents, the player behaviors are hard-coded and created with either common player traits (e.g., generic behaviors, personalities, etc.) and/or are based upon a relatively limited number of parameters. A technical problem of such conventional intelligent agents is their inability to behave "intelligently" (e.g., in more complex gameplay situations) in supporting user-tailored experiences. For example, in some systems, such intelligent agents are not fed with additional data (e.g., feedback, gameplay data, etc.) and are unable to evolve beyond a base model. In some cases, the conventional intelligent agents are incapable of drawing on self-learning implications.

A further technical problem of conventional intelligent agents is how to create, update, maintain and use output from gaming system operations in self-evolving AI-based models to enhance performance of a gaming system. Data processing to maintain these models, in real-time across many players at one-second intervals, is computationally challenging and intensive. How to incorporate such models into existing gaming systems to enhance gaming system operation and player enjoyment without undue computational costs and processing latency creates yet another technical problem.

A technical solution provided by some embodiments of the present disclosure inputs player content preferences and optionally gaming system operational information into one or more AI prompt generation, preference selection, content selection, and object selection models in a casino environment in which the various models are capable of self-evolving (also referred to herein as self-learning) based on associated outcomes (e.g., gameplay events, gameplay operations, gameplay decisions (such as gameplay choices, slot pulls, bonus selections, etc.), gameplay outcomes and behaviors (or gameplay data such as average speed of play, average cash in amount, average cash out amount, average play session length, average additional in-session cash in amounts, average wager behavior, average wagering speed, and average idle time for historical gameplay sessions), and other player related or gaming system-related parameters (e.g., behavioral shifts in gameplay decisions, biometric data, wager behavior, etc.)) to provide more appropriate player customized content for reality altering operations. For example, a gaming system may support initial training and creation of a baseline model. The gaming system may continuously feed the content and/or object selection model with historic or real time player content preferences, selected content and object pairings, and associated outcomes (e.g., gameplay decisions, behavioral shifts, button inputs, etc.)) generated by the player or EGM or other gaming system component(s) in association with a gameplay session.

In an example, the models described herein may support learning or evolving based on multiple different input sources (e.g., player data, player-related parameters (e.g., speed of play, cash in amount, cash out amount, play session length, additional in-session cash in amounts, wager behavior, wagering speed, and idle time), etc.) to increase the complexity and range of functionality of the models. Accordingly, for example, the content preference and associated content and object selection pairings can collectively render objects altered or comprising the associated content, from a plurality of such pairing selections, to induce a player to behave in a targeted manner or produce a target behavior. The accuracy of the prediction can be used to update or modify the models to yield more accurate predictive performance in future player interactions.

Aspects of the present disclosure may provide explicit improvements through AI. For example, systems described herein may support more accurate recommendations (e.g., content preference, content, and object selection recommendations by the various models) and/or predictions of behaviors (e.g., target player behaviors) based on a large number of historical player behavior data. In some aspects, multiple thousands (e.g., millions) of historical events may be incorporated into the model(s) described herein. Aspects of the present disclosure support modifying (e.g., changing, adjusting) the model(s) over time, based on single events (e.g., per each instance of a gameplay event such as granular gameplay data), groups of events (e.g., per multiple instances of gameplay events such as summarized gameplay data). Example techniques described herein may provide reduced processing overhead (e.g., computing power, calculation time, etc.) compared to other techniques that analyze all single entries of historical data and compare the entries against new data, instead of using an AI model.

Aspects of the present disclosure may support output-learnings. For example, the gaming server (e.g., using a machine learning network and a model, etc.) may compare an action or event (e.g., a new content preference, selected content, and selected object, etc.) to previous actions and/or events (e.g., a prior content preference, selected content, and/or selected object or outcome) (also referred to herein as historical actions and/or historical events). In an example, the gaming server may determine that there is a match between the action or event and a previous action or event. For example, the gaming server may determine that the action or event is the same as a previous action or event (or similar to the previous action or event with respect to a deviation threshold) under similar gameplay conditions. This comparison could be rigid, or another factor could be introduced in order to induce some randomness into the behavior.

With reference initially to FIG. 1, details of an illustrative gaming system 100 will be described in accordance with at least some embodiments of the present disclosure. The components of the gaming system 100, while depicted as having particular instruction sets and devices, are not necessarily limited to the examples depicted herein. Rather, a gaming system according to embodiments of the present disclosure may include one, some, or all of the components depicted in the gaming system 100 and does not necessarily have to include all of the components in a single device. For example, the components of a server may be distributed amongst a plurality of servers and/or other devices (e.g., a gaming device, a portable user device, etc.) in the gaming system 100 without departing from the scope of the present disclosure. In a further example, gaming devices 108*a*-*n* are included in a gaming system employing augmented reality but excluded from a gaming system employing virtual reality.

The gaming system 100 may include a communication network 104 that interconnects and facilitates machine-to-machine communications between one or multiple optional gaming devices 108 (e.g., any of gaming devices 108-*a* through 108-N), reality altering devices 110 (e.g., any of gaming devices 110-*a* through 110-N), communication devices 144 (e.g., any of communication devices 144-*a* and 144-*n*), and a gaming server 116. It should be appreciated that the communication network 104 may correspond to one or many communication networks without departing from the scope of the present disclosure. In some embodiments, gaming device 108-*a* through gaming device 108-N, reality altering devices 110-*a* through reality altering device 110-N, communication devices 144 (e.g., any of communication devices 144-*a* and 144-*n*), and gaming server(s) 116 may be configured to communicate using various nodes or components of the communication network 104. The communication network 104 may include any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

An optional generative model 180 can be in communication with the gaming system 100 via the communication network 104. The generative model 180 can be any content generation model that converts a prompt into one or more content sets. Common generative models include one of a variational autoencoder (VAE), generative adversarial network (GAN), autoregressive model, diffusion model, and transformer-based model. In some embodiments, the generative model is on the internet while in other embodiments the generative model is on a closed local network accessible only to the gaming system or multiple gaming systems.

In some embodiments, the encoder and decoder are configured as variational autoencoders (VAEs). In VAEs, the encoder extracts from the prompt input sequence all features in the sequence, converts them into vectors (e.g., vectors representing the semantics and position of a word in a sentence), and then passes them to the decoder. The decoder works on the target output sequence. Each decoder receives the encoder layer outputs, derives context from the outputs, and generates the output sequence. Both the encoder and the decoder in the transformer include multiple encoder blocks piled on top of one another. The output of one block becomes the input of another.

In some embodiments, the generative model is configured as a generative adversarial network or GAN. The GAN is a machine learning algorithm that employs, in an adversarial relationship, two neural networks, namely a generator and discriminator. The generator is a neural net that creates fake input or fake samples from a random input vector (a list of mathematical variables each of whose value is unknown) and the discriminator is a neural net that takes a given sample from the generator and decides whether or not it is a fake sample from a generator or a real sample from the domain. In some embodiments, the discriminator is a binary classifier that returns a probability of whether or not the sample is a fake. The generator and discriminator can be implemented as CNNs (Convolutional Neural Networks).

The generative model can perform many different types of transformations or translations of the prompt to content, including without limitation a style transfer of a prompt image to a generated image, sketch in the prompt to a realistic image, prompt text to an image, prompt text to speech or other audio output, prompt text to video, prompt text to lighting sequences, and a prompt image or video to a higher or lower resolution image or video.

When the prompt comprises text, a text-to-image models may be employed that generally combines a (natural) language model for transforming the input text into a latent representation, and the generative image model, which produces an image conditioned on that representation.

One or more sensors 145-*a* through 145-N can be in communication with the gaming system 100 via the communication network 104. The gaming server 116 may support example aspects described herein of acquiring sensor data associated with a gameplay session using any combination of the sensors 145 (also referred to herein as sensor devices). The sensors 145 may be implemented at (e.g., integrated in) any combination of gaming devices 108, reality altering devices 110, and/or communication devices 144. In some aspects, the sensors 145 may be standalone devices capable of communicating with any component (e.g., a gaming device 108, a reality altering device 110, a gaming system 100, a database, etc.) of the gaming system 100, for example, via the communication network 104. In some aspects, the sensors 145 may provide the sensor data to a machine learning engine, aspects of which are described later herein.

In some aspects, the sensors 145 may include any combination of: an image sensor, an eye tracking sensor, a heart rate sensor, an infrared sensor, an audio sensor (e.g., a microphone), a pulse sensor, an oxygen sensor, a temperature sensor, a pressure sensor (e.g., integrated within a button, a keypad, etc.), a touch screen sensor, a vibration sensor, a motion sensor, an accelerometer, or the like. In some cases, the sensors 145 may be integrated within a physical interface of a gaming device 108, reality altering device 110, or a communication device 144. In some cases, the sensors 145 may be integrated at or within a threshold distance of a gaming device 108 or reality altering device 110. For example, the sensors 145 may be integrated with a seat cushion, an arm rest, a seat back, a pull handle, a "spin" button, etc. of a gaming device 108.

In some aspects particularly applicable to AR and VR, the sensors 145 may include any combination of a gyroscope, GPS, accelerometer, magnetometer, solid state compass, radio frequency identification (RFID), motion sensor for tracking head, body and hand positions of a player, camera (e.g., omnidirectional camera and VR cameras), optical tracking sensor (e.g., infrared cameras) for location and navigation, motion controllers, and handheld tracking devices (such as simultaneous localization and mapping (SLAM) trackers).

In the embodiment, passive or active optical motion tracking can track and measure movements of the player relative to a 3D coordinate system. The embodiment can additionally or alternatively use non-optical motion tracking using accelerometers, gyroscopes and magnetometers. Accelerometers measure player movement along the XYZ axes of the coordinate system. Gyroscopes measure 360° rotation of the player. Magnetometers determine orientation of the player towards a magnetic field.

In some examples, the sensors 145 may capture or measure, as part of gameplay data, biometric data (e.g., facial features, facial response, eye movement, pupil dilation, heart rate, temperature, pulse, speech or speech patterns, breathing pattern, etc.) of a player with respect to a decision event, a gameplay decision, and/or a gameplay result in association with a gameplay session. The sensors 145 may detect changes and/or patterns in biometric data in association with a decision event, a gameplay decision, and/or a gameplay result in association with a gameplay session. In some aspects, the sensors 145 may include smart sensors capable of scanning and/or measuring a player's biometric parameters such as pulse, breathing rate, heart rate, eye focus, body movement, attention, electroencephalogram (EEG) parameters (e.g., electrical activity of the brain), electrocardiogram (ECG or EKG) parameters (e.g., heard rhythm and electrical activity), voice, speech pattern, etc.

In some other examples, the sensors 145 may capture or measure, as part of gameplay data, a value (e.g., force, velocity, etc.) corresponding to physical inputs (e.g., button presses, etc.) by the player at a gaming device 108 in association with a decision event, a gameplay decision, and/or a gameplay result in association with a gameplay session. For example, a sensor 145 at a gaming device 108 (e.g., gaming device 108-*a*) may be a pressure sensor integrated within a button (e.g., a "spin" button, a "bet" button, etc.) at the gaming device 108, and the sensor 145 may capture or measure a value indicating a force at which the player presses the button.

In some other examples, the sensors 145 enable player tracking using a location-based tracking service in which an application or other software in the sensor uses global positioning service (GPS), radio frequency identifier (RFID), Wi-Fi or cellular data to trigger a pre-programmed action when a communication device 144 or RFID tag carried by the player enters or exits a virtual boundary set up around a geographical location.

The sensor data (e.g., biometric data, value corresponding to a physical input, etc.) may be used as part of the gameplay data to determine an outcome associated with a prompt, autogenerated content, or pairing of selected generated content and object or to predict player real-time location in the casino or gaming system.

A resort wallet 184 (and associated casino wallet, retail wallet, sports/mobile wallet, and patron manager (not shown)) can be in communication with the gaming system 100 via the communication network 104. The patron manager manages the award of loyalty points and balance of players' loyalty points accounts. Typically, the patron manager monitors gaming events of players on gaming devices 108 and changes in the balance of the resort wallet 184 (including casino wallet, retail wallet, and sports/mobile wallet, and other player transactions with the gaming establishing or casino and, applying promotional rules, increments or decrements a player's loyalty point balance in the resort wallet 184.

Social media server(s) 188 of a social networking service can be in communication with the gaming system 100 via the communication network 104. The social networking service or SNS (or social networking site) can be any online social media platform used by members to build social networks or relationships with other members who share similar personal or career content, interests, activities, backgrounds or real-life connections. Social networking sites allow users to share ideas, digital photos and videos, posts, and to inform others about online or real-world activities and events with people within their social network. Examples include Facebook™, Instagram™, X™ or Twitter™, and the like.

In some embodiments, the gaming devices 108 (e.g., gaming device 108-*a* through gaming device 108-N) and/or reality altering devices 110 (e.g., reality altering device 110-*a* through reality altering device 110-N) may be distributed throughout a single property or premises (e.g., a single casino floor), or the gaming devices 108 (e.g., gaming device 108-*a* through gaming device 108-N) and/or reality altering devices 110 (e.g., reality altering device 110-*a* through reality altering device 110-N) may be distributed among a plurality of different properties. In a situation where the gaming devices 108 and/or reality altering devices 110 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 (e.g., gaming device 108-*a* through gaming device 108-N) and/or reality altering devices 110 (e.g., reality altering device 110-*a* through reality altering device 110-N) may utilize the same or different types of communication protocols to connect with the communication network 104. It should also be appreciated that the gaming devices 108 (e.g., gaming device 108-*a* through gaming device 108-N) and/or reality altering devices 110 (e.g., reality altering device 110-*a* through reality altering device 110-N) may present the same type of game or different types of games to a player 112. For example, the gaming device 108-*a* may correspond to a gaming machine that presents a slot game to the player 112, the gaming device 108-N may correspond to a video poker machine, and other gaming devices 108 may present other types of games (e.g., keno, sports wagering, etc.) or a plurality of different games for selection and eventual play by the player 112.

In some aspects, some of the gaming devices 108 (e.g., gaming device 108-*a* through gaming device 108-N) and/or reality altering devices 110 (e.g., reality altering device 110-*a* through reality altering device 110-N) may communicate or exchange data with one another via the communication network 104. In some embodiments, one or more of the gaming devices 108 and/or one or more of the reality altering devices 110 may be configured to communicate directly with a centralized management server and/or the gaming server 116. Although not depicted, the gaming system 100 may include a separate server or collection of servers that are responsible for managing the operation of the various gaming devices 108 in the gaming system 100.

It should also be appreciated that the gaming server 116 may or may not be co-located with one or more gaming devices 108 and/or reality altering devices 110 in the same property or premises. Thus, one or more gaming devices and/or reality altering devices 110 may communicate with the gaming server 116 over a WAN, such as the Internet. In such an event, a tunneling protocol or Virtual Private Network (VPN) may be established over a portion of the communication network 104 to ensure that communications between an EGM and the server 116 (e.g., a remotely-located server) are secured.

The optional gaming devices 108 (e.g., gaming device 108-*a* through gaming device 108-N) may correspond to a type of device that supports interaction by a player 112 in connection with playing games of chance. Examples of a gaming device 108 may include any type of known gaming device such as an EGM, a slot machine, a table game, an electronic table game (e.g., video poker), a skill-based game, etc. In addition to playing games on a gaming device 108, the player 112 may also be allowed to interact with and play games of chance on a communication device 144*a, b*.

The reality altering devices 110 (e.g., reality altering device 110-*a* through reality altering device 110-N) may correspond to a type of device that supports interaction by a player 112 in connection with playing an augmented or virtual reality game of chance. Examples of a reality altering device 110 may include any type of known reality altering device such as a digital projector, desktop computer, laptop computer, tablet computer, smart phone, head-mounted display (HMD), head-up display (HUD), eyeglasses, contact lenses, virtual retinal display (VRI), EyeTap, handheld display, among other devices. A communication device 144 of a player can alternatively provide or additionally assist in providing an augmented or virtual reality output as part of an immersive gaming experience.

In an embodiment, the reality altering device 110 comprises one or more projectors to project virtual reality or augmented reality images during the game. The projector(s) can be any projecting device that can project a computer image onto a projection augmented model (PA model) and/or a spatially augmented reality (SAR) model to provide the players 112 with augmented reality, augmented virtuality, and/or virtual reality computer-generated game environments. As will be appreciated, projection mapping, video mapping or SAR typically uses one or more optical devices or projectors that project a beam of light onto a selected spatial area to provide the player with the augmented reality, augmented virtuality, and/or virtual reality computer-generated game environments.

In an embodiment, the reality altering device 110 comprises head-mounted displays worn by the players 112 to view the augmented reality, augmented virtuality, or virtual reality computer-generated game environments.

The gaming system 100 may support interaction with one or more communication devices 144-*a* and 144-*b*. A communication device 144 (e.g., communication device 144-*a* and 144-*b*) may be a mobile device of a player 112 (e.g., a personal communication device such as a smart phone, a tablet, a smart watch, etc.), desktop computer 144-*b* (e.g., for on-line gaming), or to a device issued by a casino to the player 112. It should be appreciated that the player 112 may play AR and VR games directly on the communication device 144. Alternatively, or additionally, the communication device 144 may establish a communications (e.g., over a wireless or wired connection) with a gaming device 108 such that the communication device 144 provides an interface for the player 112 to interact with the gaming device 108. As shown in FIG. 1, the communication device 144 may be in communication with the communication network 104 or in direct communication (e.g., via Bluetooth, WiFi, etc.) with a gaming device 108. Non-limiting examples of a communication device 144 include a cellular phone, a smart phone, a tablet, a wearable device, an augmented reality headset, a virtual reality headset, a laptop, a Personal Computer (PC), or the like. In some cases, another communication device 144 (e.g., communication device 144-*b*) may be a mobile device, a PC, or the like of a casino operator (e.g., a floor attendant, a casino manager, etc.).

In some cases, the gaming system 100 may support "carding in" of a player at a gaming device 108 with a physical card (e.g., a player club card). In other cases, the gaming system 100 may support "carding in" of a player at a gaming device 108 via a mobile application on a communication device 144.

In an example of "carding in," the communication device 144 may exchange information with the gaming device 108 over a wireless connection (e.g., near field communication (NFC), Bluetooth, etc.) when the communication device 144 is within a threshold distance of the gaming device 108. In another aspect, the communication device 144 may "card in" and exchange information with the gaming device 108 when the communication device 144 is connected to the gaming device 108 using a physical communications link (e.g., a communications cable). In an example, when "carding in," the communication device 144 may provide player identification information (e.g., player identity, player club status, player preference information, etc.) to the gaming device, the server, and/or the gaming system. The gaming server 116 (or the gaming device 108) may establish a gameplay session at the gaming device 108 for the player based on the information provided during the "card in."

In an embodiment, the gaming system only enables VR and AR content modification of objects in gaming sessions with a player after he or she successfully cards in to the gaming system. Stated differently, no VR or AR content is presented to the player before he or she successfully cards in or after he or she cards out.

The gaming server 116 is further shown to include a processor 120, a memory 124, and a network interface 128. These resources may enable functionality of the gaming server 116 as will be described herein. For example, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For example, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data to and retrieve data from a player profile database 148, a content presentation database 152, and/or a gaming object database 154.

Alternatively or additionally, the player profile database 148 or data stored thereon may be stored internal to the any of the communication device 144, a gaming device 108, and/or the server 116 (e.g., within the memory 124 of the server 116 rather than in a separate database). Alternatively or additionally, the content presentation database 152 or data stored therein may be stored internal to the server 116. Alternatively or additionally, the gaming object database 154 or data stored thereon may be stored internal to the server 116.

The databases described herein (e.g., player profile database 148, content presentation database 152, and gaming object database 154) may include a relational database, a centralized database, a distributed database, an operational database, a hierarchical database, a network database, an object-oriented database, a graph database, a NoSQL (non-relational) database, etc. In some aspects, the databases may store and provide access to, for example, any of the stored data described herein.

In some aspects, the gaming system 100 may be implemented using a fully software-based solution. In some other aspects, the gaming system 100 may be implemented using a combination of software and hardware accelerators for offloading AI processing tasks and/or AI data handled at the gaming system 100. Aspects of the present disclosure and solutions thereof may be used locally at an EGM (e.g., a gaming device 108), a local server (e.g., gaming server 116 or a different server), and/or on a cloud server (e.g., gaming server 116 or a different server). Example processors (also referred to herein as co-processors) usable for offloading the AI processing tasks and/or AI data may include any combination of GPUs, ASICs, FPGAs, or the like. In some aspects, the processors (e.g., co-processors) may be located at a gaming device 108 and/or the gaming server 116. In some other aspects, processors (e.g., co-processors) located at a communication device 144 (e.g., a cellular phone, a smart phone, or a tablet), a reality gaming device 110 (such as a wearable device, an augmented reality headset, a virtual reality headset, etc.) may be used for offloading the processing tasks and/or data.

The illustrative instruction sets that may be stored in memory 124 include, without limitation, a reality altering and game instruction set 132, player profile management instruction set 133 (which may be a self-evolving AI model), content generation event detection instruction set 136, optional prompt generation instruction set 140 (which may be a self-evolving AI model), content selection instruction set 142 (which may be a self-evolving AI model), object selection instruction set 143 (which may be a self-evolving AI model), and malicious content identification set 150. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

The reality altering and game instruction set 132, when executed by the processor 120, may enable the gaming server 116 to manage the various AR and VR games played by a player 112 at the gaming devices 108 (e.g., gaming device 108-*a* through gaming device 108-N), a reality altering device 110 (e.g., reality altering device 110-*a* through reality altering device 110-N), and/or a communication device 144 carried by the player 112. For example, any game played by the player 112 at any of the gaming devices 108 and/or communication device 144 may be managed, partially or entirely, by execution of the reality altering and game instruction set 132. The reality altering and game instruction set 132 may also be configured to track a status of wager events (e.g., non-EGM wager games, sporting events, bingo, keno, lottery, etc.) and whether a player 112 has placed a wager on such events. In some embodiments, when a wager event has come to completion such that wagers made on the event become payable (e.g., at the end of a gameplay decision at a gaming device 108, reality altering device 110, and/or communication device 144, at the end of a gaming event when the final score of the event is determined), the reality altering and game instruction set 132 may update player accounts to reflect earned awards and states and/or values of tickets/vouchers issued for the event appropriately.

In some aspects, the reality altering and game instruction set 132, when executed by the processor 120, may enable the gaming server 116, reality altering device 110, and/or communication device 144 to track head, hand and body movements of a selected player to provide left and right eye images of altered real or virtual (gaming) objects during a gaming session. As will be appreciated, presenting different left and right eye images of one or more objects to a player creates an immersive 3D experience through stereopsis. The reality altering and game instruction set 132 can derive real world coordinates, independent of camera, and camera images using image registration and can use different methods of computer vision, mostly related to video tracking. These methods typically comprise first and second stages. In the first stage, the reality altering and game instruction set 132 detects interest points, fiducial markers or optical flow in the camera images. This stage can use feature detection methods such as corner detection, blob detection, edge detection, or thresholding, and other image processing methods. In the second stage, reality altering and game instruction set 132 restores a real world coordinate system from the data obtained in the first stage. The reality altering and game instruction set 132 can assume objects with known geometry (or fiducial markers) are present in the scene and can determine the scene 3D structure beforehand. SLAM can map relative positions. If no information about scene geometry is available, structure from motion methods like bundle adjustment can be used. Mathematical methods used in the second stage include: projective (epipolar) geometry, geometric algebra, rotation representation with exponential map, kalman and particle filters, nonlinear optimization, robust statistics and the like. Marker or markerless tracking techniques may be employed depending on the application. As will be appreciated, markers are visual cues which trigger the display of the virtual information. While the reality altering and game instruction set 132 can use any programming language, VR or AR operations typically use VR or VR enabling programming languages such as one or more of Virtual Reality Modeling Language (VRML), X3D, WebVR, Augmented Reality Markup Language (ARML), etc. ARML in particular uses Extensible Markup Language (XNL) grammar to describe the location and appearance of virtual objects in the scene (including as modified by selected generated content) and ECMAScript bindings to allow dynamic access to properties of virtual objects.

In some aspects, the reality altering and game instruction set 132, when executed by the processor 120, may enable the gaming server 116 to manage and/or monitor data associated with a gameplay session at a gaming device 108, reality altering device 110, and/or communication device 144. For example, the gaming server 116 may support example aspects described herein of monitoring user information (e.g., member identification information, player club status, etc.), gameplay data (e.g., quantity of plays, quantity of spins, duration of gameplay, credits spent, credits earned, etc.), and other gameplay data described above.

The player profile management instruction set 133, when executed by the processor 120, may enable the gaming server 116 to manage one or more player profiles within the player profile database 148. In some embodiments, the player profile management instruction set 133 may be configured to manage a player loyalty profile including settings for such player profiles, available wager credits for such profiles, determine player wager history, loyalty reward account balance, loyalty reward eligibility, and/or determine which, if any, tickets/vouchers are associated with a particular player. It should also be appreciated that the player profile management instruction set 133 may be configured to manage player profiles of players that do not have loyalty accounts or any other predetermined player account.

In some aspects, the player profile management instruction set 133, when executed by the processor 120, may be configured to manage a player activity, current and/or historical, associated with gameplay sessions.

In some aspects, the content generation event detection instruction set 136, when executed by the processor 120, monitors gameplay data, gaming system state, and/or sensor input, detects a content generation event that triggers content generation (e.g., auto-generation of a prompt and content by the generative model).

In some aspects, the optional prompt generation instruction set 140, when executed by the processor 120, determines a set of group content preferences based on different sets of content preferences associated with players in a group of players, in response to the detected content generation event, generates, from at least part of the set of group content preferences, a prompt to the generative model 180, and generates and provides a content generation request comprising the prompt to the generative model 180.

In some aspects, the content selection instruction set 142 and object selection instruction set 143, when executed by the processor 120, selects one or more objects from a set of (gaming) objects, receives content, such as generated by the generative model 180 in response to the content generation request, selects at least a portion of the generated content for presentation by a plurality of reality altering device associated with the group of players to represent a sensory characteristic of the selected object, and, together with the reality altering and game instruction set, determines, relative to a (3D) coordinate system, a respective spatial location of each player in the group of players and a respective spatial location of the selected object; and, based on the respective spatial locations of each player in the group of players relative to the respective spatial location of the selected object, causes at least a respective portion of the selected content to be presented by a corresponding reality altering device of the player.

In some aspects, the malicious content identification instruction set 150, when executed by the processor 120, parses both player preferences and other received player input and the received auto-generated content for malicious content.

Some or all of the instructions or instruction sets stored in the memory 124 and some functions of the gaming server 116, gaming devices 108, and/or communication devices 144 may be implemented using machine learning techniques. In some embodiments, the neural network used by the prompt generation, content selection, and object operation selection model(s) and generative model and reality altering model may be, for example, a machine learning network and may include a machine learning architecture. In some aspects, the neural network may be or include an artificial neural network (ANN). In some other aspects, the neural network may be or include any machine learning network such as, for example, a deep learning network, a convolutional neural network, a long-short term memory (LSTM) neural network, or the like. In some cases, the machine learning techniques may include reinforcement learning. In some cases, the machine learning uses unsupervised learning techniques.

To enable game event selection, the gaming server 116 can include a pseudorandom number generator (PRNG) or random number generator (RNG) 160. The RNG or PRNG generates a sequence of numbers or symbols that cannot be reasonably predicted better than by random chance. RNGs are typically hardware random-number generators (HRNGs) that generate random numbers, wherein each generation is a function of the current value of a physical environment's attribute that is constantly changing in a manner that is practically impossible to model. In contrast, PRNGs generate numbers that only look random but are in fact predetermined and can be reproduced simply by knowing the state of the PRNG.

Figure 2:
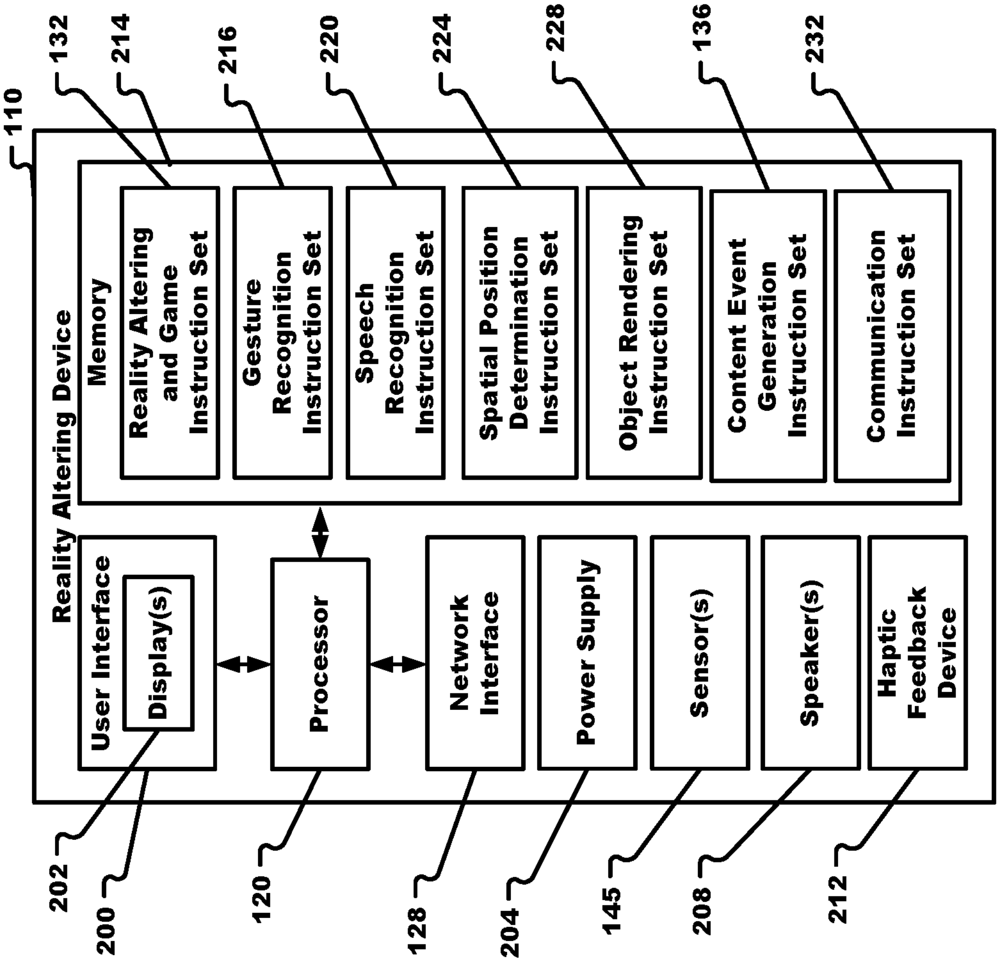
FIG. 2 is a block diagram of a reality altering device in accordance with aspects of the present disclosure.

With reference to FIG. 2, additional details of the components that may be included in a reality altering device 108 will be described in accordance with at least some embodiments of the present disclosure.

The reality altering device 108 is depicted to include a processor 120, a network interface 128, a user interface 200 comprising one or more display devices 202, a power supply 204, one or more sensors 145, one or more speakers 208, a haptic feedback device 212, and memory 214. The processor 120 may be configured to execute one or more instruction sets stored in memory 214.

The user interface 200 may correspond to any type of input and/or output device that enables the player 112 to interact with the reality altering device 110. As can be appreciated, the nature of the user interface 200 may depend upon the nature of the reality altering device 110. For instance, the user interface 200 can include a speech recognition system that translates a player's spoken words into computer instructions, and/or a gesture recognition system that interprets a player's body movements by visual detection or from sensors 145 embedded in a peripheral device such as a wand, stylus, pointer, glove or other body wear. The display device(s) 202 can include first and second display devices for the player's left and right eyes to cause the player to view a 3D image from separate 2D images through stereopsis. The display devices have at least a Minimal Angle of Resolution (MAR) and refresh rate for a more immersive gaming experience. The user interface 200 can include one or more depressible buttons for tactile user input. The user interface 200 can include one or more touch-sensitive displays, LED/LCD display screens to receive player input. In some cases, the user interface 200 may include a combination of a physical interface (e.g., depressible buttons) and other user interfaces (e.g., touch-sensitive displays, LED/LCD display screens, etc.).

The display device 202 may include a display driver, a power supply 204, and/or other components configured to enable operation of the display device 202. The display driver may receive commands and/or other data provided by the processor 120 and one or more of the instruction sets in memory 214. In response to receiving the commands, the display driver may be configured to generate the driving signals necessary to render the appropriate images to the display screen. The power supply 204 may provide electric power to the components of the display device 202. In some embodiments, the power supply 204 may include a transformer and/or other electronics that prevent overloading, condition power signals, and/or provide backup power to the display device 202. The input/output may correspond to one or more connections for receiving or exchanging information and/or video from the gaming server 116. The input/output may include an interconnection to the network interface 128. By way of non-limiting example, the input/output may include a high-definition multimedia interface (HDMI) input, Ethernet, composite video, component video, H.264, or other video connection. Non-limiting examples of the display device(s) may include, but are in no way limited to, a liquid crystal display (LCD), a light-emitting diode (LED) display, an electroluminescent display (ELD), an organic LED (OLED) display, and/or some other two-dimensional and/or three-dimensional display.

The reality altering device 110 may include any combination of sensors 145 described with reference to FIG. 1, such as to track motion of the player's head, eyes, hands, and/or body.

The haptic feedback device 212 can provide tactile sensory feedback to the player to simulate the haptics involved in touching virtual objects. In some applications, the haptic feedback device 212 comprises wearable multi-string cables embedded in gloves to offer fine control of each finger joint of the player to simulate the haptics involved in touching a selected object.

The speaker(s) 208 provide audible feedback to the player in connection with the virtual objects to further enhance the immersive experience.

The memory 214 may include one or multiple computer memory devices that are volatile or non-volatile. The memory 214 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 214 may be configured to store the instruction sets depicted in addition to temporarily storing data for the processor 120 to execute various types of routines or functions. The instruction sets can enable user interaction and game play with the reality altering device 110. Examples of instruction sets that may be stored in the memory 214 include a reality altering and game instruction set 132 discussed above, gesture recognition instruction set 216, speech recognition instruction set 220, spatial position determination instruction set 224, object rendering instruction set 228, content event generation instruction set 136 discussed above, and communication instruction set 232.

In some embodiments, the gesture recognition instruction set 216, when executed by the processor 120, may enable the reality altering device 110, using sensor 145 input, to translate physical movements (e.g., hand, eye, head, etc.) into a corresponding computer command. The gesture instruction set 216 can use any software that captures and interprets a player's gesture, such as a 3D model-based algorithm, skeletal-based algorithm, appearance-based model, electromyography-based model, and the like.

In some embodiments, the speech recognition instruction set 220, when executed by the processor 120, may enable the reality altering device 110 to translate player audible speech into a corresponding computer command. The speech recognition instruction set 220 is typically based on a hidden Markov model (HMM). The HMM is a statistical model that outputs a sequence of symbols or quantities. HMMs treat a speech signal as a piecewise stationary signal or a short-time stationary signal.

The player commands could be directed to changing the object type, appearance, or position within the immersive environment.

The spatial position determination instruction set 224, when executed by the processor 120, may enable the reality altering device 110 to determine a current position of a body part (e.g., head, hand, eyes, body, etc.) of the player relative to a (3D) coordinate system which is used to express coordinate positions of one or more (gaming) objects. As will be appreciated, the position of the player's body part relative to a selected object is used to generate the left and right eye images of the object to be presented to the left and right eye display devices of the reality altering device 110.

The object rendering instruction set 228, when executed by the processor 120, may enable the reality altering device to generate the left and right eye images to be presented by left and right display devices for each player to provide the immersive experience. Using the relative coordinate system positions of the player's body part compared to an exterior surface of the selected object, the processor 120 provide slightly different left and right eye 2D images of the exterior surface to create a 3D image through stereoposis.

The communication instruction set 232, when executed by the processor 120, may enable the reality altering device 110 to communicate via the communication network 104. As an example, the communication instruction set 232 may be configured to enable cellular, WiFi, and/or Bluetooth communications with other devices. The communication instruction set 232 may follow predefined communication protocols and, in some embodiments, may enable the reality altering device 110 to remain paired with a gaming server 116 or gaming device 108 as long as the reality altering device 110 is within a predetermined proximity (e.g., 20-30 feet, an NFC communication range, or a Bluetooth communication range) and paired with the gaming server 116 or gaming device 108. In some embodiments, the communication instruction set 232 enables an application of the reality altering device to negotiate a secure, authenticated connection with the proper functionality, versions and security settings.

Figure 3:
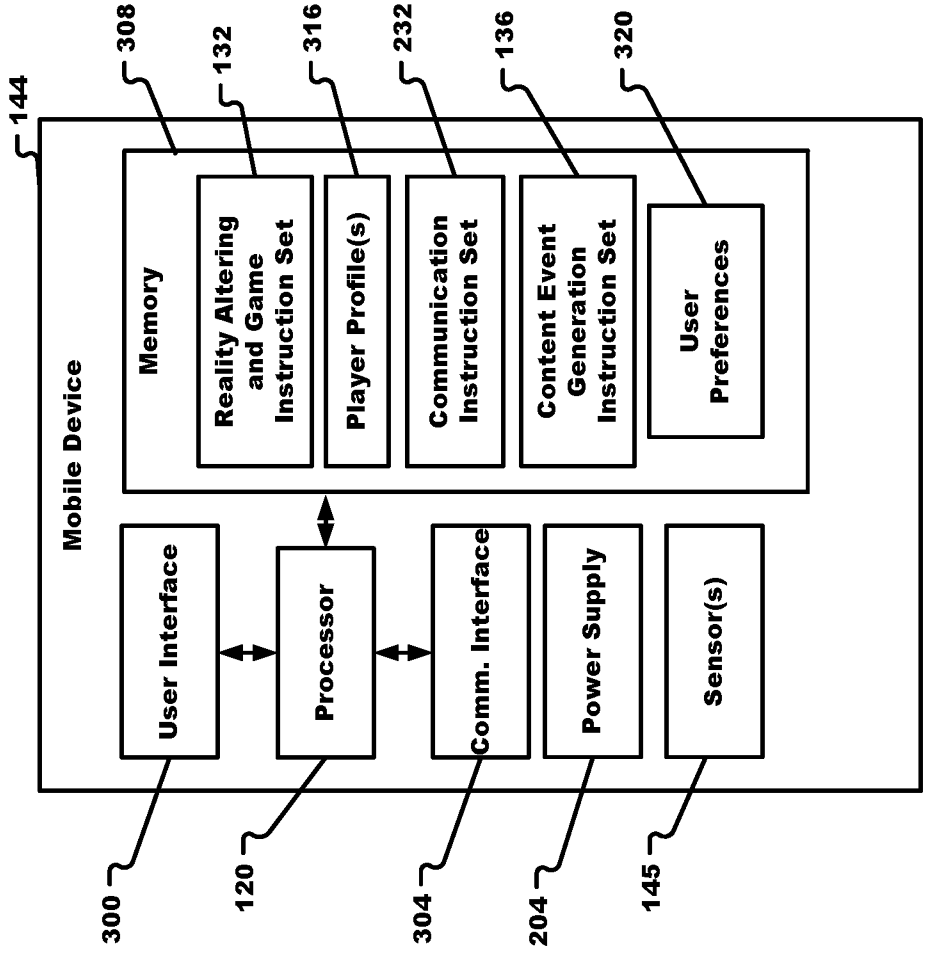
FIG. 3 is a block diagram of a mobile device in accordance with aspects of the present disclosure.

With reference now to FIG. 3, additional details of the components that may be included in a mobile device 144 will be described in accordance with at least some embodiments of the present disclosure. The mobile device 144 is shown to include a processor 120 discussed above, memory 308, a communication interface 304, sensors 145 discussed above, and a user interface 300. The processor 120 may be configured to execute one or more instruction sets stored in memory 308. In some embodiments, the instruction sets stored in memory 308, when executed by the processor 120, may enable the mobile device 144 to provide game play functionality, interact with gaming machines 108, the reality altering device 110, or gaming server 116, pair with gaming machines 108 or reality altering devices 110, or any other type of desired functionality.

The communication interface 304 may be similar or identical to the network interface 128 depicted and described herein. The nature of the communication interface 304 may depend upon the type of communication network 104 for which the mobile device 144 is configured. Examples of a suitable communication interfaces 304 include, without limitation, a WiFi antenna and driver circuit, a Bluetooth antenna and driver circuit, a cellular communication antenna and driver circuit, a modulator/demodulator, etc. The communication interface 304 may include one or multiple different network interfaces depending upon whether the mobile device 144 is connecting to a single communication network 104 or multiple different types of communication networks. For instance, the mobile device 144 may be provided with both a wired communication interface and a wireless communication interface without departing from the scope of the present disclosure.

The user interface 300 may include a combination of a user input and user output device. For instance, the user interface 300 may include a display device, a microphone, a speaker, a haptic feedback device, a light, a touch-sensitive display, a button, or a combination thereof. The user interface 300 may also include one or more drivers for the various hardware components that enable user interaction with the mobile device 144.

The memory 308 may be similar or identical to other memory 124, 214 depicted and described herein and may include one or multiple computer memory devices that are volatile or non-volatile. The memory 308 may be configured to store instruction sets that enable player interaction with the mobile device 144 and that enable game play at the mobile device 144. Examples of instruction sets that may be stored in the memory 308 include a reality altering and game instruction set 132 discussed above, player profile(s) 316, content event generation instruction set 136 discussed above, user preferences 320, and a communication instruction set 232 discussed above. In addition to the instruction sets, the memory 308 may also be configured to store data that is useable by the various instruction sets.

The player profile(s) 316 include a variety of player-specific data structures including player identification and login credentials.

The user preferences 320 may correspond to gaming or wager or player engagement preferences that are desired by the player 112 of the mobile device 144, including content preferences.

The mobile device 144 is also shown to include a power supply 204 discussed above.

Figure 4A:
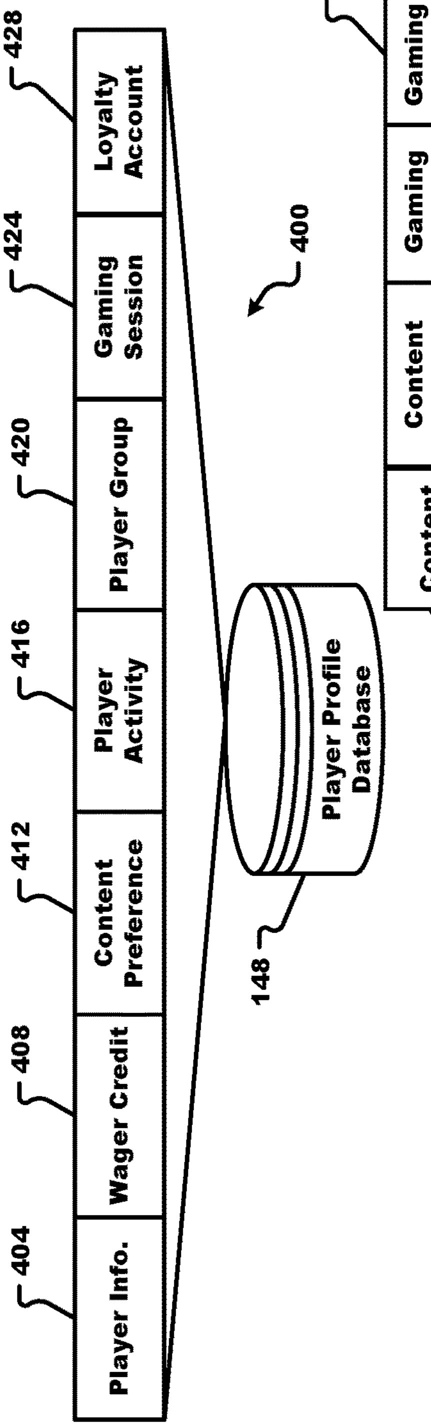
FIG. 4A is a block diagram illustrating a first example data structure used in accordance with aspects of the present disclosure.
Figure 4B:
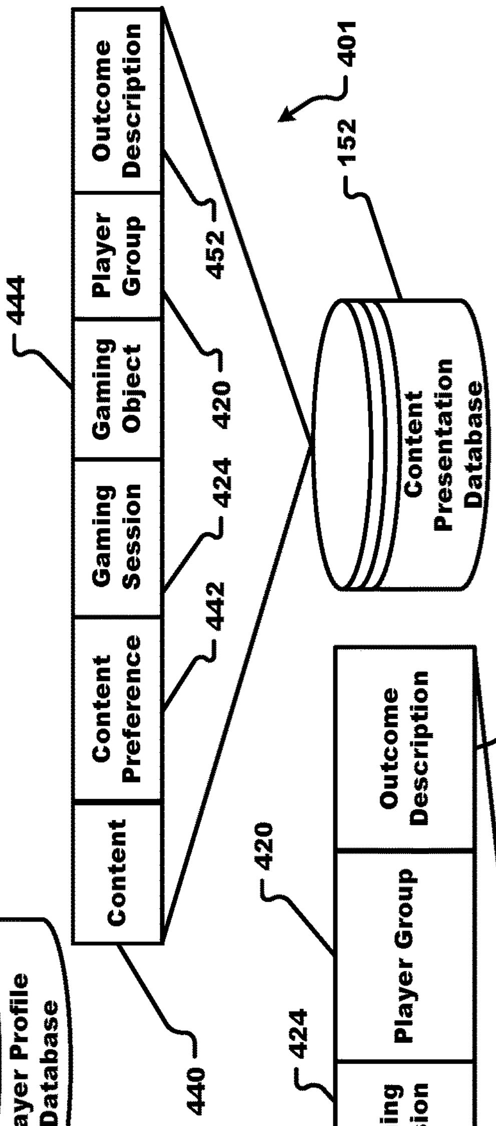
FIG. 4B is a block diagram illustrating a second example data structure used in accordance with aspects of the present disclosure.
Figure 4C:
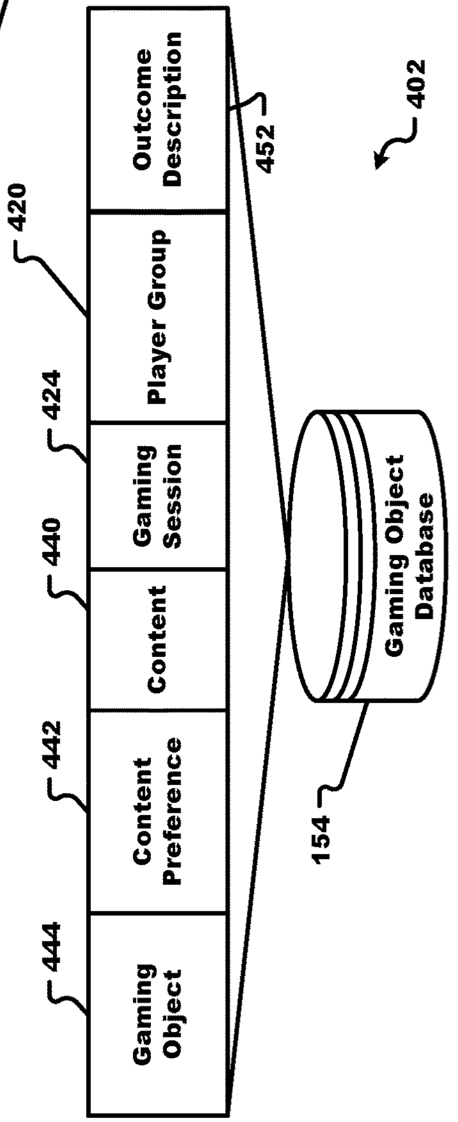
FIG. 4C is a block diagram illustrating a third example data structure used in accordance with aspects of the present disclosure.

With reference now to FIGS. 4A through 4C, additional details of data structures will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming server 116, a gaming device 108, a reality altering device 110, and/or a communication device 144 without departing from the scope of the present disclosure.

With reference initially to FIG. 4A, details of a data structure 400 that may be maintained as part of a player profile will be described in accordance with at least some embodiments of the present disclosure. The database 148 may be configured to store one or multiple data structures 400 that are used in connection with tracking player progress and gaming history. In some embodiments, the data stored in the data structure 400 may be stored for a plurality of different player profiles or for a single player profile. As a non-limiting example, the data structure 400 may be used to store player loyalty information, player activity information, and the like. Even more specifically, the data structure 400 may include a plurality of data fields that include, for instance, a player information field 404, a wager credit field

408, a content preference field 412, a player activity field 416, a player group ID field 420, a gaming session ID field 424, and a loyalty account field 428.

The player information field 404 may be used to store any type of information that identifies a player or a group of players. In some embodiments, the player information field 404 may store one or more of username information for a player 112, password information for a player account, player status information, contact information for the player, accommodations associated with the player 112, and any other type of customer service management data that may be stored with respect to a player 112.

The wager credit field 408 may be used to store data about the available credit of a player 112 with a device, with a sports book, with a casino, and/or with a plurality of casinos. For instance, the wager credit field 408 may store an electronic record of available credit in the player's account and whether any restrictions are associated with such credit. The wager credit field 408 may further store information describing a player's available credit over time, cash out events for the player, winning events for the player 112, wagers placed by the player 112, tickets/vouchers issued to the player 112, and the like.

The content preference field 412 may be used to store data about one or more content preferences of a player 112. For instance, the content preferences include whether or not the player opts in or out of using his or her content preferences for auto-generation of content, content preferences obtained from monitoring activity of the player with respect to the gaming system, content preferences obtained by monitoring player posted content on a social media server 188, and content preference inputted by the player for use in auto-generating images.

The player activity field 416 may be used to store historical data for events that occur with respect to the player 112 (e.g., gameplay data associated with gameplay sessions of the player 112). For example, the player activity field 416 may store information associated with the player 112 in relation to an outcome in a game of chance, an outcome in a game of skill, a celebration event for a person other than the player 112, involvement in a celebration event, visits to a predetermined location, gameplay information with respect to a particular game, player interactions with a communication device 144, player interactions (e.g., gameplay decisions, player feedback with respect to a baseline player behavior, etc.) with a gaming device 108, wagers placed by the player 112, tickets/vouchers issued for the player 112, tickets/vouchers redeemed by the player 112, etc.

In some aspects, the player activity field 416 may store sensor data (e.g., biometric data, pressure sensor data, etc. described herein) associated with a player in relation to gameplay sessions. For example, the player activity field 416 may store sensor data associated with gameplay data (e.g., gameplay behavior, gameplay decisions, etc.) and/or gameplay events (e.g., gameplay decision events, gameplay outcomes, gameplay recommendations or predictions by a player behavior model linked to the player, etc.).

The player group field 420 may store information associated with a player group of which the player is a member. The player group field may describe the group and its members along with sessions historically or currently being played by the members or comprise an ID that references another data field containing this information. The player group field 420 may be an identifier of the player group field, such as a database link or address of the field to indicate which players had content preferences used to generate the content in content field.

The gaming session field 424 may store information associated with a gameplay session involving the player (e.g., including the gaming information discussed above). The field may include an identifier of a gaming session in which the player is involved. The gaming session ID may be generated by the gaming system to reference another data field further describing the gaming session. The field may include a database link or address to the field in another database.

The loyalty account field 428 may store information regarding the corresponding player's loyalty account status and other information, such as player loyalty tier ranking (e.g., gold, silver, bronze, etc.).

With reference now to FIG. 4B, details of another data structure 401 that may be used within the gaming system 100 will be described in accordance with at least some embodiments of the present disclosure. The database 152 may be configured to store one or multiple data structures 401 that are used in connection with reality altering models. Even more specifically, the data structure 401 may include a plurality of data fields that include, for instance, a content field 440, content preference field 442, gaming session field 424 (discussed above), gaming object field 444, player group field 420 (discussed above) and outcome description field 452.

The content field 440 may include any information related to a corresponding generated content. In some aspects, the content field 440 may store any data associated with an selected generated content. For example, the content field 440 may store data associated with the selected content such as one or more of an identifier (ID) assigned to the selected content, prompt (or the seed) corresponding to the selected content, object modified by the selected content, and outcome associated with the selected content. The data may be used to develop and train baseline models, modified versions of the AI-based models, or the like.

The content preference field 442 may include any information related to one or more player individual or group content preferences used to generate the corresponding content. In some aspects, the content preference field 442 may store any data associated with a content preference. For example, the content preference field 442 may store data associated with the content preference, such as one or more of an identifier (ID) assigned to the content preference, player profile source(s) corresponding to the selected content preference, and criteria used to select the content preference for the player group. The data may be used to develop and train baseline models, modified versions of the AI-based models, or the like.

The gaming object field 444 may include any information related to a gaming object rendered in whole or part using the corresponding content. In some aspects, the gaming object field 444 may store any data associated with a gaming object. For example, the gaming object field 444 may store data associated with the gaming object, such as one or more of gaming object type, gaming object description (such as location (e.g., relative to the coordinate system) and appearance of the virtual object in the scene and other properties of the virtual object), an identifier (ID) assigned to the gaming object, and criteria used to pair the gaming object with the corresponding content. The data may be used to develop and train baseline models, modified versions of the AI-based models, or the like.

The outcome description field 452 may include any data describing an outcome associated with the selected content or the pairing of the selected content with the gaming object. The outcome typically includes an outcome description indicating whether or not the content and associated content modified gaming object produced a desirable or undesirable outcome for the gaming system and players. The outcome for instance can indicate a level of gameplay of and/or wagering one or more players while the content is rendered, a level of popularity of the game as modified by the content, a level of occupancy of gaming devices providing the game modified by the content, other gameplay or loyalty data, and the like.

With reference to FIG. 4C, details of a data structure 402 that may be maintained as part of a gaming object profile will be described in accordance with at least some embodiments of the present disclosure. The gaming system database 154 may be configured to store one or multiple data structures 402 that are used in connection with monitoring am AR or VR gaming session. In some embodiments, the data stored in the data structure 402 may be stored for a plurality of different gaming objects or a single gaming object. As a non-limiting example, the data structure 402 may be used to store gaming object information (including the information referenced above in connection with gaming object field 444), and the like. Even more specifically, the data structure 402 may include a plurality of data fields that include, for instance, a gaming object field 444, a content preference field 442, a content field 440, a gaming session field 424, a player group field 420, and outcome description field 452 (all of which are discussed above).

The data structures may include other data fields.

For example, a gaming device information field may be used to store any type of information that identifies a gaming device 108 or a group of gaming devices 108. In some embodiments, the gaming device information field may store identification information for a gaming device 108 (e.g., a unique serial number assigned to the gaming device 108) and any other type of gaming device management data that may be stored with respect to a gaming device 108.

A reality altering device information field may be used to store any type of information that identifies a reality altering device 110 or a group of reality altering devices 110. In some embodiments, the reality altering device information field may store identification information for a reality altering device 110 (e.g., a unique serial number assigned to the reality altering device 110) and any other type of gaming device management data that may be stored with respect to a reality altering device 110.

A gaming system information field may be used to store any type of gameplay and other gaming information including granular and/or summarized gameplay data, gaming system (e.g., casino floor) map showing gaming device location and current usage (e.g., heat map), game theme, game or gaming session type, and the like.

As will be appreciated, any of the identifiers referenced above may be an identifier of a corresponding data structure, such as a database link or address.

A number of examples of auto-generated content and associated prompts will be discussed to demonstrate the present disclosure.

Figure 5:
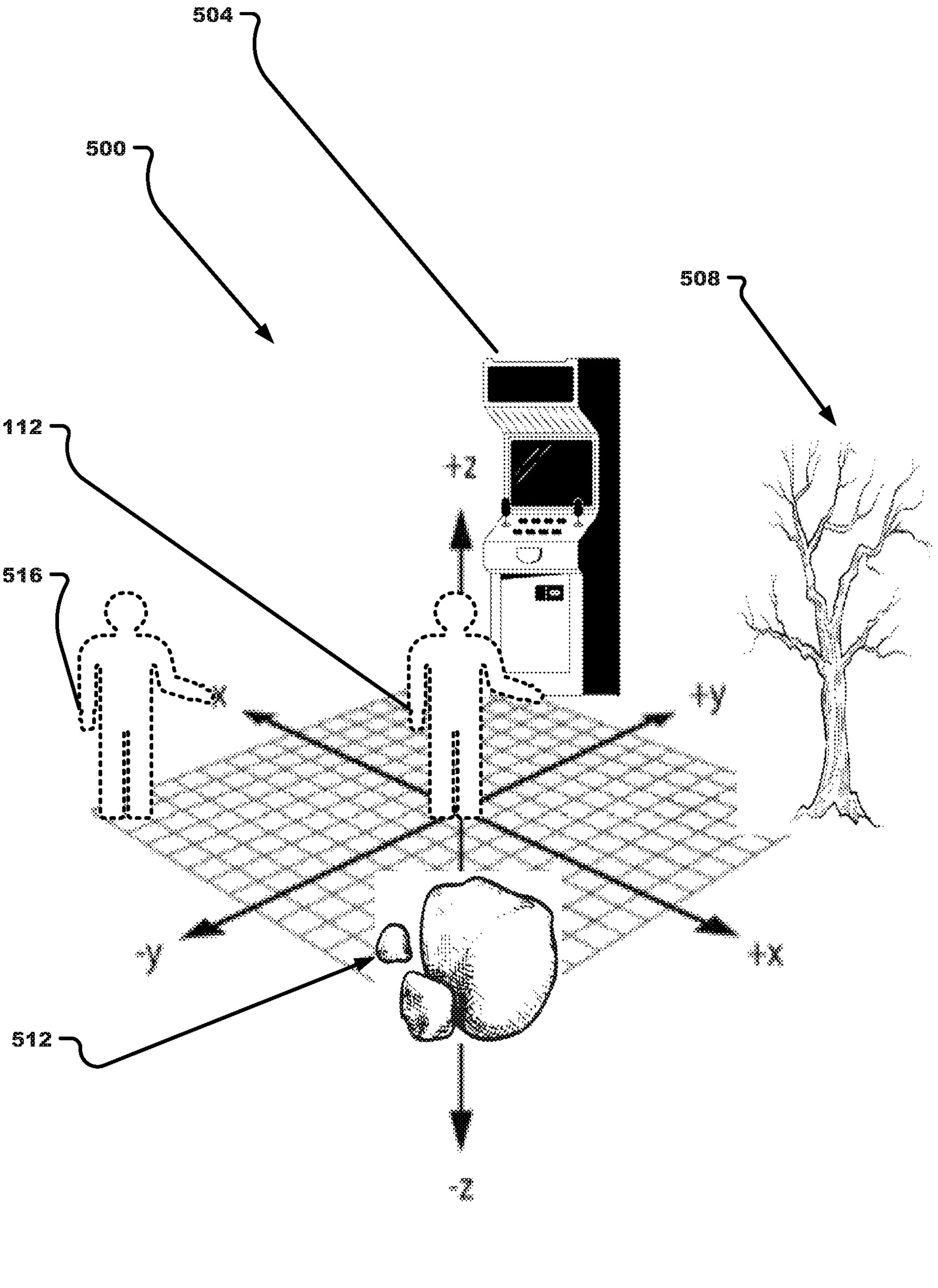
FIG. 5 depicts a reality altered output of a reality altering gaming model in accordance with aspects of the present disclosure.

With reference to FIG. 5, a simplified and exemplary immersive VR or AR gaming experience is illustrated according to embodiments of the present disclosure. The immersive environment 500 comprises a real or virtual gaming device 504, a virtual tree 508, virtual rocks 512 (e.g., that may be used to mask a tripping hazard such as an item of furniture or step for a player), and a representation 516 of another player (such as a virtual character of another player 112, player character controlled by another player 112, and a non-player character that is not controlled by a player but by the reality altering model). The player 112 associated with the reality altering device rendering the immersive environment 500 may or may not be represented by a virtual character based on an individual content preference of the player or selected content preference from the set of content preferences for the player group. As will be appreciated, the gaming device 504, virtual tree 508, and virtual rocks 512 can be any animate or inanimate object, the type and appearance of which is based on the selected content associated with one or more selected content preferences. Likewise, the appearance and type and appearance of the representation 516 can be based on an individual content preference of a player or a selected content preference from the set of content preferences for the player group. In some embodiments, the theme of the gaming session (which is determined by the gaming system or gaming system operator) is a factor considered in the selection of the type of virtual objects employed and content preference employed in rendering the appearance of the virtual object.

Each real or virtual object in the immersive environment 500 is associated with a different set of spatial coordinates relative to the X, Y and Z axis coordinate system. For purposes of simplicity, the player 112 is positioned at the origin of the coordinate system, though the player 112 can be positioned at any location in the coordinate system depending on the application. In some applications, the player is always positioned at the origin, such that the origin of the coordinate system moves with the player in which case the sets of coordinates associated with each of the other objects changes dynamically based on the position of the origin. In some applications, the origin is stationary and the player position is determined relative to the origin. As a result, the sets of coordinates associated with each of the other objects (e.g., inanimate objects in particular) also remains stationary while the set of coordinates associated with the player 112 changes in response to player movement.

To refresh the immersive environment 500 in response to movement of the player's body to a new set of spatial coordinates, and/or movement of the player's head and/or eyes (e.g., the direction of gaze of the player), the reality altering model determines the surfaces of each object to be viewed from the new position of a body part of the player 112, generates new images of each viewable surface and slightly modifies each of the new images to provide left and right eye images for each object. The various images are then assembled into a composite left and right eye image relative to the coordinate system, and the composite left and right eye images are provided to the reality altering device of the player 112.

A number of examples will now be discussed with reference to autogenerating content by a generative model 180 from a text prompt generated from a set of content preferences for an individual player or group of players, with the received content being used in rendering the appearance of one or more real or virtual objects.

Figure 6:
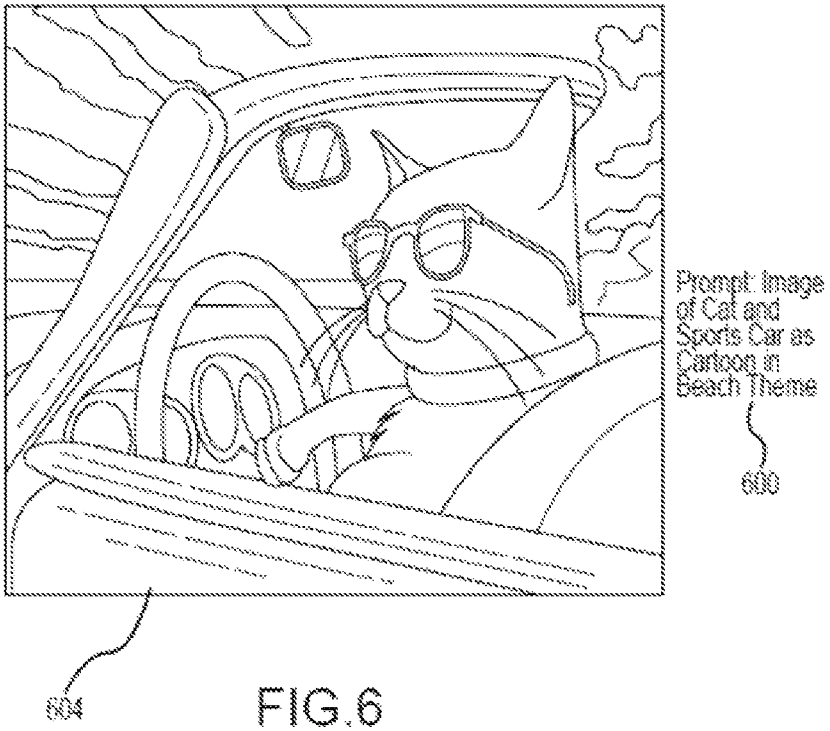
FIG. 6 is a screenshot of a prompt and associated generated content in accordance with aspects of the present disclosure.

With reference to FIG. 6, a text prompt 600 comprising text regarding an image of cat and sports car in beach game theme was used by the generative model 180 to generate the image 604. The prompt 600 results from a first player having a first content preference, namely images of cats; a second player having a second content preference, namely images of sports cars; and the gaming system operator configuring the gaming devices being played by the first and second players in a beach game theme. The appearance of one or more selected virtual objects can be modified to include the image of FIG. 6.

Figure 7:
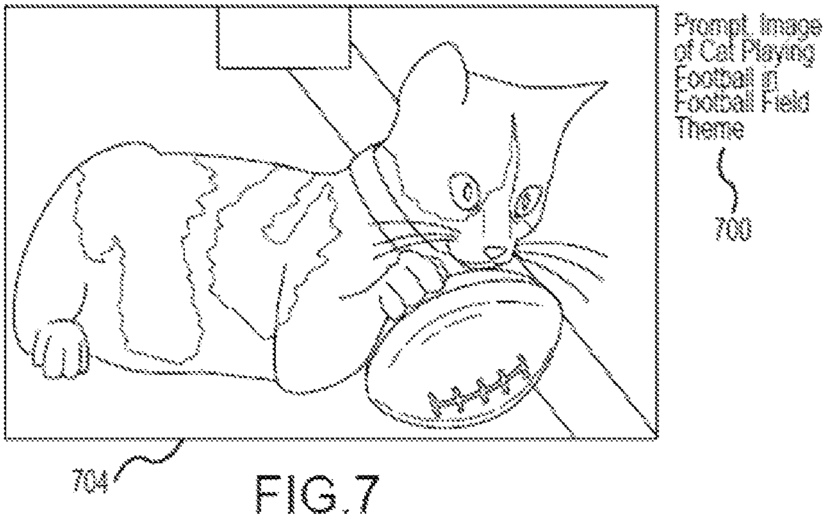
FIG. 7 is a screenshot of a prompt and associated generated content in accordance with aspects of the present disclosure.

Another example is illustrated in FIG. 7 in which a text prompt 700 comprising text regarding an image of cat playing football in a football field game theme was used by the generative model to generate the image 704. The prompt 700 results from the first player having the first content preference, namely images of cats; a third player having a third content preference, namely images of football related objects; and the gaming system operator configuring the gaming devices being played by the first and second players in a football game theme. The appearance of one or more selected virtual objects can be modified to include the image of FIG. 7.

The prompt can be in any format. The prompt can be text, image, music, audio, and video information and a combination thereof. Prompts can be in any format, such as binary, XML, json or other format that can provide the information desired. The prompt can be based on a content preference of an individual player, a group of players (such as for all high rollers), and/or a gaming system operator.

In another example in accordance with at least some embodiments of the present disclosure, the auto-generated content is created for a player at the beginning of a gaming session. When the player cards in, the content is auto-generated by the generative model for that player. Since generating the content takes time, the player can play a game without the auto-generated content until the content is ready at which point one or more objects of the game can be modified to include the selected generated content.

In another example in accordance with at least some embodiments of the present disclosure, the gaming system triggers auto-generation of content before the player starts a gaming session. For example, when the gaming system detects a trigger event such as the player's presence, the gaming system triggers auto-generation of the content so that the content is ready for the player. The triggering event could come, for instance, from a loyalty activity, such as the player checking in at a hotel desk associated with the gaming system. The trigger could come from the gaming system wirelessly detecting the presence and/or location of the player's mobile phone or the mobile phone application in spatial proximity to the gaming system. The trigger could come from sensing biometric identification of the player, such as one or more of the sensors 145 performing facial recognition that the player is in the casino or near the gaming area.

In another example in accordance with at least some embodiments of the present disclosure, the gaming system triggers auto-generation of the content in response to a player gaming activity reaching some threshold, such as wagering a certain amount of money or a period of time, winning a certain amount of money over a period of time or triggering a bonus. For example, the player wagers $1,000 in one hour so the gaming system triggers auto-generation of content for the player.

In another example in accordance with at least some embodiments of the present disclosure, the gaming system triggers auto-generation of content when the gaming system detects that existing auto-generated content is not being used or chosen by players as much as desired. The operator might have a setting or threshold in the outcome that triggers the regeneration based on lack of use or other indication of a lack of interest. For example, "trigger new AI content when players have not used auto-generated content (associated with a preference of the player) in one week".

In another example in accordance with at least some embodiments of the present disclosure, the gaming system triggers auto-generation of content when the gaming system detects that the game performance or one or more game themes is below some outcome threshold. The threshold could be games played, money wagered, or money won over a period of time, such as "Trigger AI content if a game theme is played less than 10,000 times this week". The outcome threshold could also be based on how "old" the game is such that new content is created more often the longer the game theme is installed on a casino floor. In this manner, a new game would not initially have auto-generated content because the game's default content is new, but over time the gaming system would allow auto-generation of new content to replace the aging default content of the game.

In another example in accordance with at least some embodiments of the present disclosure, the gaming system triggers auto-generation of the content when the gaming system learns something new about the player that constitutes a new content preference. For example, the player updates their account with the casino or posts on social media. The gaming system now has an additional content preference about the player so the gaming system generates new content based on this information. In a similar embodiment, the trigger comes from the gaming system analyzing and categorizing the player's activity and in response generates new content. For example, the gaming system analyzes the player's content and determines that the player is a high roller. The gaming system, in response, generates new content for a player based on this information. Triggers of this category could also include the player joining a loyalty club, playing games, or using casino services or engaging in other loyalty activities.

In another example in accordance with at least some embodiments of the present disclosure, the auto-generated content is used by the player indefinitely or for a predetermined period of time or until a termination event occurs, such as the duration of a current gaming session, the duration of a visit to the casino, or for a fixed period of time (e.g., one week). The termination event can be detected by the gaming system, such as the player carding out, leaving a defined spatial area, checking out of a hotel, or cashing out the credit meter.

In another example in accordance with at least some embodiments of the present disclosure, the player can extend the period of time the content is available through gaming activities. For example, the time period is extended another day for each day the player continues to gamble or use casino services.

In another example in accordance with at least some embodiments of the present disclosure, the player can trigger the auto-generation of content using player loyalty points. This could be achieved using the service window of the gaming device.

In another example in accordance with at least some embodiments of the present disclosure, the auto-generation of content is throttled such that the gaming system only auto-generates content at a certain frequency or at certain clock values, such as a limit of once per day or in response to occurrence of predetermined gaming system states.

In another example in accordance with at least some embodiments of the present disclosure, once the player is determined to be eligible the gaming system prompts the player if he or she wants to trigger auto-generation.

In another example in accordance with at least some embodiments of the present disclosure, the triggering of the event depends on the player loyalty status and/or the player loyalty status determines how many content auto-generation events are available to the player.

In another example in accordance with at least some embodiments of the present disclosure, the player is allowed to choose from multiple received auto-generated contents. For example, three sets of auto-generated content are received from the generative model and presented to the player, and the player selects none or one or more of them to be used in the gaming system. The player can further select the object to be used for each selected content.

The information used in the prompt to auto-generate the content can be used to provide each player with unique auto-generated content, thereby providing each player with a customized experience. In an exemplary embodiment, the auto-generated content is based on the player's social media information from the social media server(s) 188, which is incorporated into the prompt. For instance, the gaming system determines that Bob likes to travel based on the published information on Bob's Facebook™ account. In response, the gaming system uses the prompt "Slot symbols for traveling to Europe" when generating content for Bob. In an exemplary embodiment, the auto-generated content uses the player's activity (such as gameplay information or loyalty activities) in the casino to generate the prompt. In one example, the player Bob saw the "Cirque du Soleil" show at the casino and therefore the gaming system uses the prompt "Cirque du Soleil slot symbols" or "Circus background" or "Circus music" as the content preference for the prompt. In another example, Bob plays many video poker games, so the gaming system uses the prompt "Poker symbols for a slot symbol" based on the perceived content preference of Bob for video poker. In another exemplary embodiment, a prompt could be based on multiple content preferences associated with player Bob, such as the prompt "Poker symbols on a vacation" because Bob likes to travel (based on his Facebook™ account) and plays poker frequently (based on his gameplay activities in the casino). In an embodiment, the prompt comprises images or sounds from the player's Facebook™ account and incorporates the player's images or sounds into the auto-generated content.

While the various examples herein focus on textual content preferences and prompts and auto-generated images, it is to be understood that the content preferences, prompts, and auto-generated content can be in any form, including not only text but also images, videos, lighting colors and sequences, and sounds.

While the various examples herein simplistically use content preferences, prompts and auto-generated images, such as cars, sports and cats, it should be appreciated that content preferences, prompts, and auto-generated content can be much more complex and include multiple types of media as well as style, content suggestions, colors or color scheme, a composition, an attribute of a picture, an animation or sound created by the generative model, and the like. Prompts, for example, can be complex such as "Picture of a sports car, with a cat facing left, in the style of Vincent van Gogh". In another example, the gaming system notices that the player has many portrait photos on their Facebook™ page, so the gaming system uses the prompt "Portraits of a cat" instead of "Pictures of a cat". These increasingly complex examples can require more complex user interfaces and logic to build the prompts from the content preferences with artificial intelligence being an example of such complex logic.

In another example in accordance with at least some embodiments of the present disclosure, the player can choose whether to use normal gaming content or the auto-generated content for one or more objects. Similarly, in an exemplary embodiment the player can choose which object(s) from among plural objects are to be used for selected auto-generated content particularly when more than one auto-generated content set is available.

In another example in accordance with at least some embodiments of the present disclosure, the player can opt out of any auto-generated content. The opt out selection could be associated with the player's profile such that the gaming server knows that the player does not wish to use auto-generated content in a gaming session.

In other embodiments associated with AR, a defined area of the gaming system has a game theme that represents the likes, dislikes, or behaviors of the group of players and/or non-players in that area, thereby creating various areas in the casino where people with similar likes and dislikes will move and therefore create social and identity benefits. The different areas of the gaming system can use auto-generated content to automatically game theme the areas of a casino dynamically.

In another example in accordance with at least some AR embodiments of the present disclosure, the operator can exclude certain areas of the casino from participating in the auto-generated content. The defined or partitioned areas can be physical, such as in a brick-and-mortar casino or logical or virtual such as in an online virtual casino. This limitation can be useful when the gaming system already has heavily branded areas, and the operator does not desire to use auto-generated content. The operator can provide a prompt (i.e., "virtual player preferences") for an area that is combined with the player preferences. For example, the gaming system has an area that is beach-game themed. The operator enters the prompt "beach theme" for the area and that prompt is combined with the players preferences. Alternatively or additionally, one or more areas are not abstract and rigidly defined by the gaming system but rather dynamically in response to behavior of the players. For example, the gaming system picks a group of players that are spatially near each other and then defines the gaming devices that are near the players to be the area or in the same gaming device grouping.

Content can be auto-generated from a prompt constructed from different content preferences of different players in a player group. By way of illustration, a first content generation trigger event results from a first player entering a defined area of the gaming system. The first player has a content preference for sports cars. At a first time, the gaming server creates a first prompt using the game theme assigned to the area (for the sake of illustration a beach game theme) and the first player's content preference for images of sports cars. The resulting auto-generated image is used to modify a object associated with an EGM rendered by the first player's gaming device. A second content generation trigger event results from a second player subsequently entering the area of the gaming system while the first player is playing a gaming session on the gaming device. The entry of the second player into the defined area can be determined based on Bluetooth low energy (BLE) energy and application geolocation data of the player's mobile device 144. The second player has a content preference for images of cats. In response to the second content generation trigger event, the gaming system constructs a second prompt comprising the first player's content preference for sports car images, the second player's content preference for cat images, and the assigned beach game theme for the defined area. FIG. 6 is a possible example of the received auto-generated image generated based on the prompt "Image of cat and sports car as cartoon in beach theme". The image used for the EGM can be updated to include the auto-generated image from the second prompt.

In an example in accordance with at least some embodiments of the present disclosure, a content generation trigger event is not triggered until there are at least a threshold number of eligible players in the defined area having combinable content preferences. For example, the operator might have a threshold, such as three players having associated content preferences, that must be in a defined area before the content is auto-generated. For example, when there is only one person in the area, the gaming system might not auto-generate content. By contrast in another example, when there is one (or less than a threshold number of) players in the area, the gaming system can combine multiple content preferences from that one (or less than a threshold number of) players to create a prompt for auto-generated content.

In an example in accordance with at least some embodiments of the present disclosure, the player content preferences may be generated from sensor 144 feedback, such as images from cameras. The casino, casino or mobile applications can capture pictures or videos of the players and identify aspects of the players. For example, a first player can be wearing a Las Vegas Raiders shirt, and in response the gaming system determines that the first player likes football, the Raiders, and/or sports and generates a content preference accordingly. For instance, the gaming system might create the prompt "football" based on this information. Returning to the example above, if the second player were also in the defined football-game themed area with the first player, a prompt and image such as that in FIG. 7 could be generated for use in a object of the gaming devices in the area.

In an example in accordance with at least some embodiments of the present disclosure, when the gaming system senses that a new person enters a defined area, the prompt and associated content are immediately created (e.g., the gaming system immediately triggers a content generation trigger event that starts the creation) or after a certain period of time has elapsed since the person entered the area. The prompt combines the content preferences of the new player with the game theme of the defined area and content preferences of other players in the area.

In an example in accordance with at least some embodiments of the present disclosure, the gaming system creates new prompts and associated content periodically based on the players in the area at predetermined time intervals. For example, every 10 minutes the gaming system determines the identities of the players in the area and, using the content preferences of the players, creates new content.

In an example in accordance with at least some embodiments of the present disclosure, the gaming system ranks the players and chooses only a certain number of players for the prompt generation. For example, there are ten players in the area, but the gaming system only takes the content preferences for the top three players. The ranking of the players can be based on gameplay data, loyalty point balance, player assigned tier ranking (e.g., silver, gold and platinum), and other ranking factors.

In an example in accordance with at least some embodiments of the present disclosure, the gaming system, in developing the prompt, weights the content preferences of the players based on a player ranking or commonality of content preferences of the players. An example of the former would be the gaming system assigning a first weight to a first player's content preferences and a lower second weight to a second player's content preferences. An example of the latter would be the gaming system assigning a first weight to a content preference shared by multiple players in the area and a lower second weight to a content preference unique to one player in the area. The different weightings can be used to determine whether a content preference is eligible for inclusion in the prompt and therefore auto-generation of the content. Weightings that are less than a selected threshold can be excluded from the prompt.

In an example in accordance with at least some embodiments of the present disclosure, a player can opt in or opt out of participating in the content generation. When opted out, the gaming system does not include the player's content preferences in the generation and the player may or may not be eligible to participate, such as by wagering, side-wagering, or playing, in gaming sessions using auto-generated content in a object. Prohibiting opting out players from participating in gaming sessions can enable other players in the area or participating in the gaming session to know that each of the participating players has the same group of content preferences (have similar likes or dislikes or have commonly created the currently displayed content).

In the following description of the process flow 800, the operations may be performed in a different order than the order shown, or the operations may be performed in different orders or at different times. Certain operations may also be left out of the process flow 800, or other operations may be added to the process flow 800. It is to be understood that any device (e.g., a gaming device 108, a reality altering device 110, a gaming server 116, a communication device 144, components of the system 100, etc.) may perform the operations shown.

Figure 8:
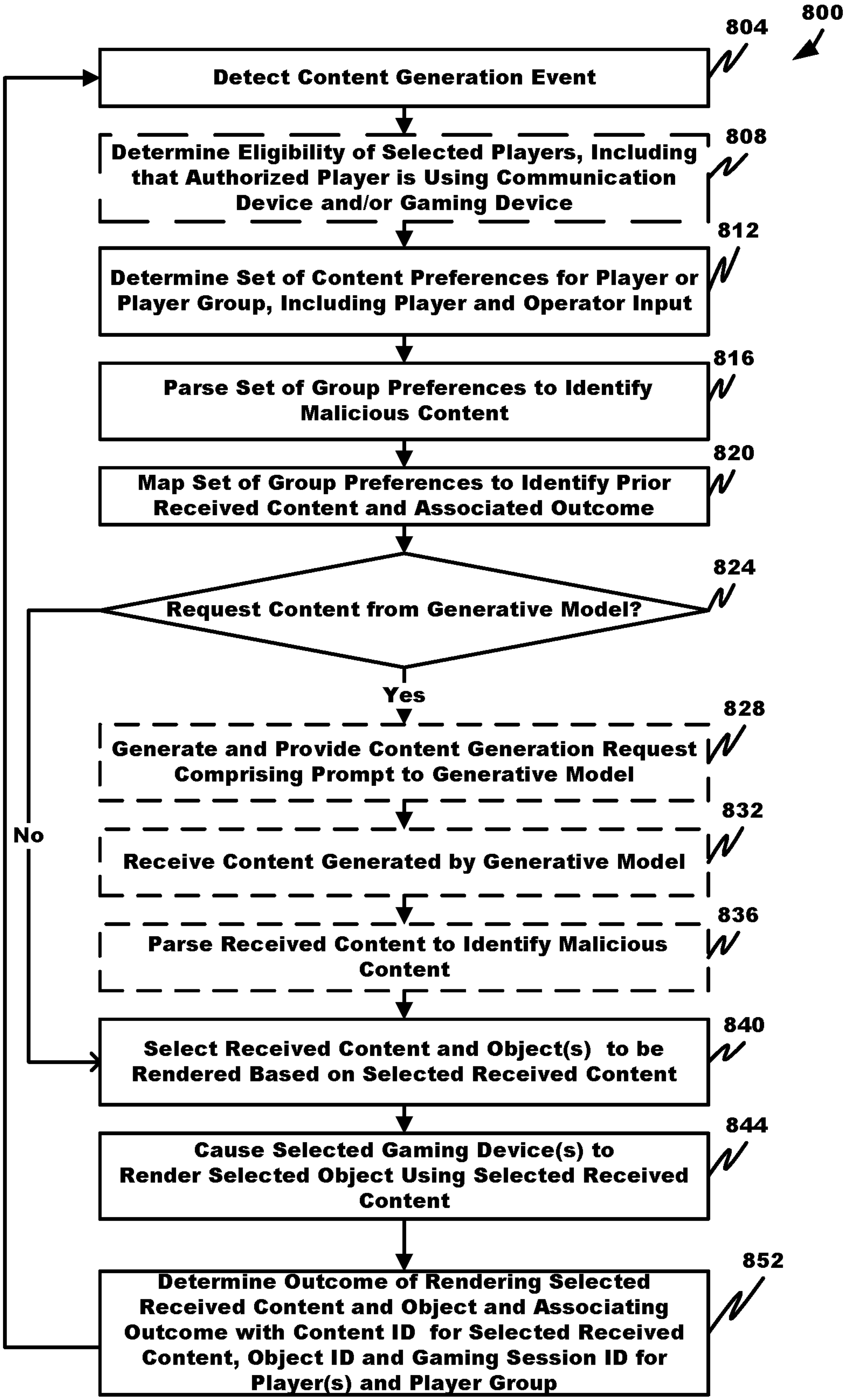
FIG. 8 is a process flow illustrating aspects of content generation in accordance with aspects of the present disclosure.
Figure 9:
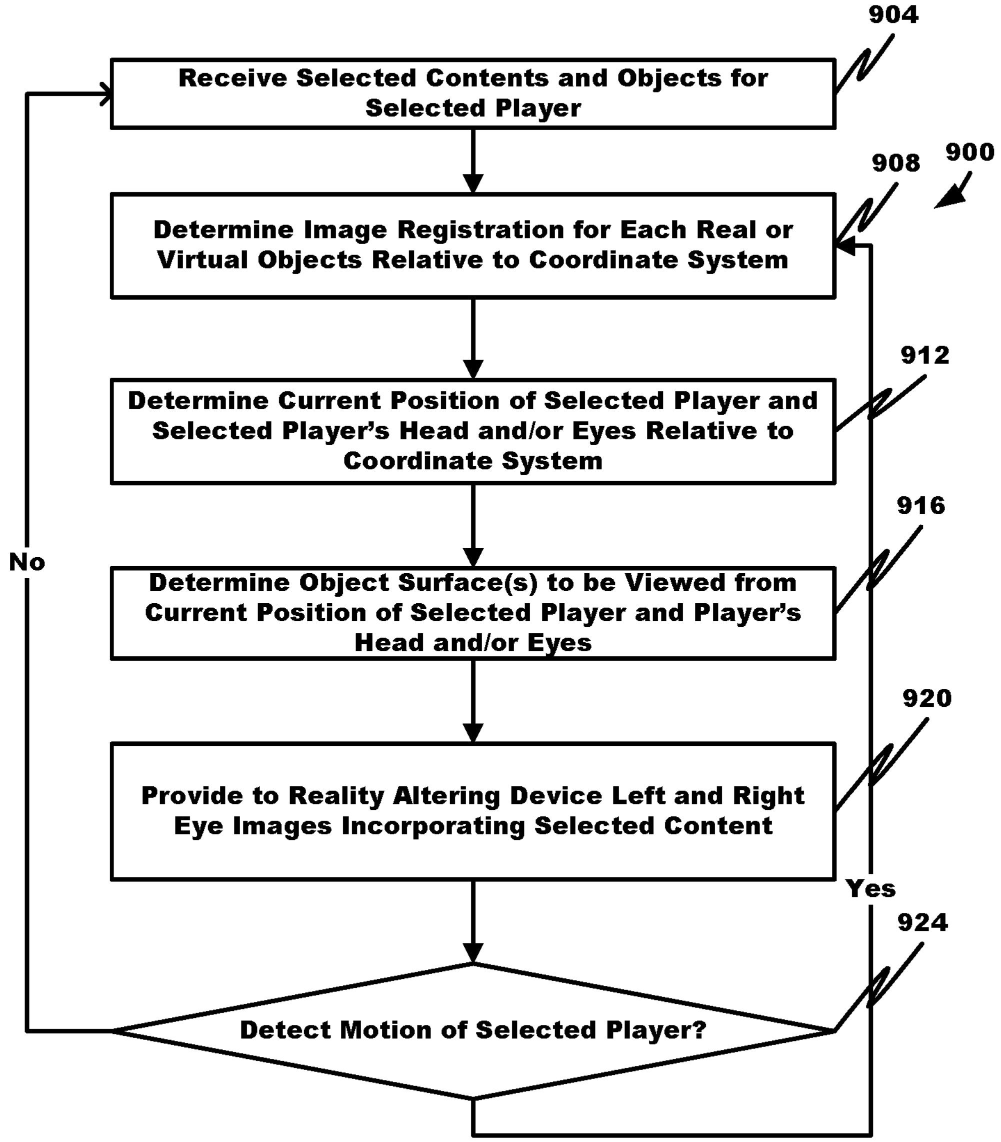
FIG. 9 is a screen shot of a gaming device showing player preferences used in content generation in accordance with aspects of the present disclosure.

Referring now to FIGS. 8 and 9, a method of using the generative model(s) to autogenerate content for modification of objects of the gaming system will be described in accordance with embodiments of the present disclosure.

The method begins when the gaming server 116 detects a content generation or trigger event to generate content (step 804).

The method continues by optionally determining whether a selected player or group of players associated with the trigger event is eligible to have content preferences used in auto-generating content (step 808). Eligibility can be based, for example, on successfully authenticating that the authorized player is using the communication device 144 or gaming device 108 or reality altering device 110, determining that the player has content preferences that may be used in auto-generating content, and determining that the player has not opted out of permitting his or her content preferences to be used or in using auto-generated content in a gaming session. Authentication can be done by any suitable authentication techniques, such as single use passwords or passcodes, digital certificate, image recognition by gaming system camera still or video images, and other knowledge-based, physiological biometrics-based, behavioral biometrics-based, and two/multi-factor authentication techniques.

The method continues by determining a set of content preferences for the selected player or group of players, including player and operator input (step 812).

The method continues by parsing the set of content preferences for the selected player or group of players to identify malicious content (step 816).

After filtering out any content preference in the set comprising potential malicious content, the method continues by the gaming system mapping the set of group preferences to other sets of group preferences to identify prior received content and associated outcomes (step 820). The comparison can be done by parsing selected content preferences in the current set against selected content preferences in prior sets of content preferences. The comparison is assigned a similarity indicator indicating a level of similarity. Only compared sets of preferences having at least a threshold level of similarity are determined to be similar.

The method continues in decision diamond 824 by determining, from the mapping of step 820, whether or not to request new content from the generative model. Generally when the filtered set of preferences maps (or has at least a predetermined level of similarity to) to a prior set of preferences used in a prompt and therefore content previously generated using the prompt and the content has an associated outcome that has at least a threshold level of success, the gaming system 116 proceeds to step 840 (discussed below) using the previously generated content in lieu of new content. When the set of preferences does not have at least a predetermined level of similarity to a prior set of preferences or the previously generated content identified by the mapping does not have at least a threshold level of success, the gaming system proceeds to step 828.

The method continues by optionally generating and providing a content generation request comprising a prompt to the generative model (step 828). The prompt is generated using any of the techniques described above. When multiple sets of content preferences are associated with a player group, a set of group content preferences can be extracted from the multiple content preference sets, such as identifying and filtering out duplicates, filtering out content preferences from less desirable or lower ranked players, filtering out content preferences that have a weighting below a selected threshold, identifying and including more popular content preferences, and filtering out content preferences that violate a game rule or other gaming system rule, are inconsistent with other content preferences in the sets, or inconsistent with a game theme selected by the operator for the gaming devices being played by the player group. Once the set of group content preferences is selected, the prompt is constructed from the master set and game theme and included in the content generation request. The content generation request is sent to the generative model or AI host.

The method continues by optionally receiving autogenerated content from the generative model (step 832).

The method continues by optionally parsing the received content to identify malicious content or otherwise undesirable content that might violate one or more prohibited content rules of the gaming system (step 836). Examples of prohibited content rules include rules banning pornography or profanity, competitor logos, marks, website links, and materials, and other rules set up by the operator.

After filtering out any received content comprising potential malicious content, the gaming system saves the filtered content in association with the prompt and selects, from among the plurality of sets of received content, received content and objects to be modified based on the selected received content (step 840). In some applications the gaming system selects multiple sets of received content from the plural sets and assigns each to a different object.

The method continues by causing the selected reality altering device(s) to cause each of the selected objects to be modified by the appropriate set(s) of received selected content (step 844). This can be done by notifying the reality altering device that new content is available for an identified object.

An embodiment for causing the selected reality altering device to render the selected objects as modified by the appropriate set(s) of received selected content is shown in FIG. 9.

The method 900 commences by the reality altering model receiving the selected contents and object IDs to be altered by the selected contents for a selected player (step 904).

The method continues by determining image registration for each of the real (AR) or virtual (VR) objects relative to the coordinate system.

The method continues by determining the current position of the selected player and selected player's head and/or eyes relative to the coordinate system (step 912).

The method continues by determining the object surface(s) of each object to be viewed from the current position of the selected player and the player's head and/or eyes (step 916).

The method continues by providing the selected player's reality altering device's left and right display devices with left and right eye images, respectively, incorporating the selected content modified object images.

In decision query 924, the reality altering model determines if motion of the head, eyes, and/or body of the selected player has been detected. When detected, the model returns to step 908. When not detected, the model returns to step 904.

Returning to FIG. 8, the method continues by determining the outcome of rendering selected received content and associating the outcome with a content ID for the selected received content and gaming session ID for the selected realty altering device(s) and player(s) (step 852) while the display(s) of the gaming(s) display the content. The gaming device records the history of the gaming session ID in association with the content including the outcome, object and content IDs, and player group ID.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices or reality altering devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, web browser, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices or reality altering devices in combination with one or more central servers, central controllers, or remote hosts; (c) one or more personal gaming devices or reality altering devices in combination with one or more electronic gaming machines; (d) one or more personal gaming devices or reality altering devices, one or more electronic gaming machines, and one or more central servers, central controllers, or remote hosts in combination with one another; (e) a single electronic gaming machine; (f) a plurality of electronic gaming machines in combination with one another; (g) a single personal gaming device or reality altering device; (h) a plurality of personal gaming devices or reality altering devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" or "reality altering device" as used herein represents one personal gaming device or reality altering device or a plurality of personal gaming devices or reality altering devices (as appropriate), and "central server, central controller, or remote host" as used herein represents one central server, central controller, or remote host or a plurality of central servers, central controllers, or remote hosts.

As noted above, in various embodiments, the gaming system includes an EGM (or personal gaming device or reality altering device) in combination with a central server, central controller, or remote host. In such embodiments, the EGM (or personal gaming device or reality altering device) is configured to communicate with the central server, central controller, or remote host through a data network or remote communication link. In certain such embodiments, the EGM (or personal gaming device or reality altering device) is configured to communicate with another EGM (or personal gaming device or reality altering device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device or reality altering device) in combination with a central server, central controller, or remote host, the central server, central controller, or remote host is any suitable computing device (such as a server) that includes at least one processor and at least one memory device or data storage device. As further described herein, the EGM (or personal gaming device or reality altering device) includes at least one EGM (or personal gaming device or reality altering device) processor configured to transmit and receive data or signals representing events, messages, commands, or any other suitable information between the EGM (or personal gaming device or reality altering device) and the central server, central controller, or remote host. The at least one processor of that EGM (or personal gaming device or reality altering device) is configured to execute the events, messages, or commands represented by such data or signals in conjunction with the operation of the EGM (or personal gaming device or reality altering device). Moreover, the at least one processor of the central server, central controller, or remote host is configured to transmit and receive data or signals representing events, messages, commands, or any other suitable information between the central server, central controller, or remote host and the EGM (or personal gaming device or reality altering device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device or reality altering device). Further, one, more than one, or each of the functions of the at least one processor of the EGM (or personal gaming device or reality altering device) may be performed by the at least one processor of the central server, central controller, or remote host.

In certain such embodiments, computerized instructions for controlling any games (such as any primary or base games and/or any secondary or bonus games) displayed by the EGM (or personal gaming device or reality altering device) are executed by the central server, central controller, or remote host. In such "thin client" embodiments, the central server, central controller, or remote host remotely controls any games (or other suitable interfaces) displayed by the EGM (or personal gaming device or reality altering device), and the EGM (or personal gaming device or reality altering device) is utilized to display such games (or suitable interfaces) and to receive one or more inputs or commands. In other such embodiments, computerized instructions for controlling any games displayed by the EGM (or personal gaming device or reality altering device) are communicated from the central server, central controller, or remote host to the EGM (or personal gaming device or reality altering device) and are stored in at least one memory device of the EGM (or personal gaming device or reality altering device). In such "thick client" embodiments, the at least one processor of the EGM (or personal gaming device or reality altering device) executes the computerized instructions to control any games (or other suitable interfaces) displayed by the EGM (or personal gaming device or reality altering device).

In various embodiments in which the gaming system includes a plurality of EGMs (or personal gaming devices), one or more of the EGMs (or personal gaming devices or reality altering devices) are thin client EGMs (or personal gaming devices or reality altering devices) and one or more of the EGMs (or personal gaming devices or reality altering devices) are thick client EGMs (or personal gaming devices or reality altering devices). In other embodiments in which the gaming system includes one or more EGMs (or personal gaming devices or reality altering devices), certain functions of one or more of the EGMs (or personal gaming devices or reality altering devices) are implemented in a thin client environment, and certain other functions of one or more of the EGMs (or personal gaming devices or reality altering devices) are implemented in a thick client environment. In one such embodiment in which the gaming system includes an EGM (or personal gaming device or reality altering device) and a central server, central controller, or remote host, computerized instructions for controlling any primary or base games displayed by the EGM (or personal gaming device or reality altering device) are communicated from the central server, central controller, or remote host to the EGM (or personal gaming device or reality altering device) in a thick client configuration, and computerized instructions for controlling any secondary or bonus games or other functions displayed by the EGM (or personal gaming device or reality altering device) are executed by the central server, central controller, or remote host in a thin client configuration.

In certain embodiments in which the gaming system includes: (a) an EGM (or personal gaming device or reality altering device) configured to communicate with a central server, central controller, or remote host through a data network; and/or (b) a plurality of EGMs (or personal gaming devices or reality altering device) configured to communicate with one another through a communication network, the communication network may include a local area network (LAN) in which the EGMs (or personal gaming devices or reality altering devices) are located substantially proximate to one another and/or the central server, central controller, or remote host. In one example, the EGMs (or personal gaming devices or reality altering devices) and the central server, central controller, or remote host are located in a gaming establishment or a portion of a gaming establishment.

In other embodiments in which the gaming system includes: (a) an EGM (or personal gaming device or reality altering device) configured to communicate with a central server, central controller, or remote host through a data network; and/or (b) a plurality of EGMs (or personal gaming devices or reality altering devices) configured to communicate with one another through a communication network, the communication network may include a wide area network (WAN) in which one or more of the EGMs (or personal gaming devices or reality altering device) are not necessarily located substantially proximate to another one of the EGMs (or personal gaming devices or reality altering devices) and/or the central server, central controller, or remote host. For example, one or more of the EGMs (or personal gaming devices or reality altering devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices or reality altering devices) are located. In certain embodiments in which the communication network includes a WAN, the gaming system includes a central server, central controller, or remote host and an EGM (or personal gaming device or reality altering device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device or reality altering device) configured to communicate with a central server, central controller, or remote host through a data network; and/or (b) a plurality of EGMs (or personal gaming devices or reality altering devices) configured to communicate with one another through a communication network, the communication network may include an internet (such as the Internet) or an intranet. In certain such embodiments, an Internet browser of the EGM (or personal gaming device or reality altering device) is usable to access an Internet game page from any location where an Internet connection is available. In one such embodiment, after the EGM (or personal gaming device or reality altering device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device or reality altering device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device or reality altering device). Examples of implementations of Internet-based gaming are further described in U.S. Pat. No. 8,764,566, entitled "Internet Remote Game Server," and U.S. Pat. No. 8,147,334, entitled "Universal Game Server."

The central gaming server, central gaming controller, or remote host and the EGM (or personal gaming device or reality altering device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following:

a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming system, comprising:

a communication interface;

a processor coupled with the communication interface; and a computer-readable storage medium coupled with the processor, the computer-readable storage medium comprising instructions that enable the processor to:

detect a content generation event;

determine a set of group content preferences based on different sets of player content preferences associated with different players in a group of players;

in response to the detected content generation event, generate, from at least part of the set of group content preferences, content for presentation by a reality altering device of each player in the group of players;

apply a set of rules to select content in the generated content for presentation by the reality altering device of each player in the group of players to represent a sensory characteristic of a selected object in a set of objects, each reality altering device being in communication with the communication interface, wherein the set of rules comprises one of a location of the object relative to a physical structure, content blacklist rules defining blacklisted content, content whitelist rules defining whitelisted content, a level of occupancy of other players in spatial proximity to the group of players, an age of a selected player in the group of players, a player loyalty level of the selected player, and player accessibility to a desired spatial location;

determine, relative to a coordinate system, a respective spatial location of each player in the group of players and a respective spatial location of the selected object; and based on the respective spatial location of each player in the group of players relative to the respective spatial location of the selected object, cause at least a respective portion of the selected content to be presented by a corresponding reality altering device of each player.

2. The gaming system of claim 1, wherein each reality altering device provides an augmented reality gaming experience for each player in the group of players, wherein the sensory characteristic comprises one of a visual appearance, an auditory sound, haptic feedback, somatosensory sensation, and olfactory smell, wherein each reality altering device comprises a processor, display, sensor to sense a location or activity of a corresponding player, and input device, wherein the respective portion of the selected content is different than a respective portion of the selected content presented by a second reality altering device to a second player at a different spatial location, and wherein objects in the set of objects comprises real objects.

3. The gaming system of claim 1, wherein the instructions enable the processor to:

in response to the detected content generation event, generate, from at least part of the set of group content preferences, a prompt to a generative model;

provide a content generation request comprising the prompt to the generative model; and in response to the content generation request, receive the generated content generated by the generative model, wherein the prompt and received content each comprise one of text, image, music, audio, and video information, wherein the content is generated by a generative model comprising one of a variational autoencoder (VAE), generative adversarial network (GAN), autoregressive model, and transformer-based model, and wherein the prompt comprises one of a player content preference associated by a player profile with a player of the group of players, a player content preference associated with a social website posting of a player of the group of players, a game theme associated with a game, a loyalty level of a player of the group of players, and a loyalty point balance of a player of the group of players.

4. The gaming system of claim 1, wherein each reality altering device provides a virtual reality gaming experience for each player in the group of players, wherein the sensory characteristic comprises one of a visual appearance, an auditory sound, haptic feedback, somatosensory sensation, and olfactory smell, wherein each reality altering device comprises a processor, display, sensor to sense a location or activity of a corresponding player, and input device, wherein objects in the set of objects comprises virtual objects and is free of real objects, wherein the respective portion of the selected content is different than a respective portion of the selected content presented by a second reality altering device to a second player at a different spatial location, and wherein the selected object comprises one of a virtual character, player character, a non-player character, and an inanimate virtual object.

5. The gaming system of claim 1, wherein the detected content generation event comprises one of detection of at least a threshold level of gameplay by a player of the group of players, detection of occurrence of a predetermined state of the gaming system, detection of occurrence of a predetermined player loyalty activity by the gaming system, detection that gameplay on another reality altering device currently presenting different selected content is below a threshold level of gameplay, detection that a presentation duration of the different selected content is at least a threshold duration, occurrence of at least a threshold loyalty point balance or loyalty status associated with a player of the group of players, and occupancy of at least a threshold number of players of the group of players in a defined area of the gaming system, and wherein the processor, based on the respective locations of first and second players in the group of players relative to the respective spatial location of the selected object, causes a first respective portion of the selected content to be presented by a first reality altering device of the first player and a different second respective portion of the selected content to be presented by a second reality altering device of the second player.

6. The gaming system of claim 1, wherein the processor causes common selected content to be incorporated into the presentation of the selected object by multiple reality altering devices, wherein the processor renders different objects in spatial proximity to the group of players using different selected content, and wherein the processor, based on the different first and second player content preferences of first and second players of the group of players, causes a first respective portion of the selected content to be presented by a first reality altering device of the first player and a different second respective portion of the selected content to be presented by a second reality altering device of the second player and wherein the first and second respective portions of the selected content are related to a common game theme.

7. The gaming system of claim 1, wherein the processor, based on the respective spatial locations of first and second players in the group of players relative to the respective spatial location of different first and second selected objects, causes first selected content to be presented by first and second reality altering devices of the first and second players, respectively, for the first selected object, monitors behavior of the first and second players in response to presentation of the first selected content, and based on monitored behavior, selects and causes second selected content to be presented by the first and second reality altering devices of the first and second players, respectively, for the second selected object.

8. The gaming system of claim 1, wherein the set of group content preferences comprises a content preference regarding one of a text, image, music, audio, color, style, animation, and video information, wherein the processor determines the set of group content preferences by weighting a first set of player content preferences of a first player of the group of players more than a second set of player content preferences of a second player of the group of players, and wherein in selecting the content in the generated content, the processor determines a relatedness of the generated content against a current game theme of the gaming system.

9. The gaming system of claim 3, wherein the processor determines whether a selected player in the group of players is eligible to have a corresponding set of player content preferences included in the prompt, wherein the processor associates a game or session identifier associated with game played by the group of players while the selected content is presented by the reality altering devices to the group of players and gameplay information associated with a played game with a content identifier associated with the selected content and an object identifier associated with the selected content, and wherein the processor applies a set of rules in selecting a virtual object from a set of virtual objects, the set of rules comprising one of a location of the virtual object relative to a physical structure, content blacklist rules, content whitelist rules, a level of occupancy of other players in spatial proximity to the group of players, an age of a selected player in the group of players, a player loyalty level of the selected player, and player accessibility to a desired spatial location.

10. A method, comprising:

detecting, by a processor, a content generation event;

determining, by the processor, a set of group content preferences based on different sets of player content preferences associated with different players in a group of players;

in response to the detected content generation event, generating, by the processor from at least part of the set of group content preferences, content for presentation by a reality altering device of each player in the group of players;

applying, by the processor, a set of rules to select content in the generated content for presentation by each reality altering device of the group of players to represent a sensory characteristic of a selected object in a set of objects, wherein the set of rules comprises one of a location of an object relative to a physical structure, content blacklist rules defining blacklisted content, content whitelist rules defining whitelisted content, a level of occupancy of other players in spatial proximity to the group of players, an age of a selected player in the group of players, a player loyalty level of the selected player, and player accessibility to a desired spatial location;

determining, by the processor relative to a three-dimensional coordinate system, a respective spatial location of each player in the group of players and a respective spatial location of the selected object; and based on the respective spatial location of each player in the group of players relative to the respective spatial location of the selected object, causing, by the processor, at least a respective portion of the selected content to be presented by a corresponding reality altering device of each player.

11. The method of claim 10, wherein each reality altering device provides an augmented reality gaming experience for each player in the group of players, wherein the sensory characteristic comprises one of a visual appearance, an auditory sound, haptic feedback, somatosensory sensation, and olfactory smell, wherein each reality altering device comprises a processor, display, sensor to sense a location or activity of a corresponding player, and input device, wherein the respective portion of the selected content is different than a respective portion of the selected content presented by a second reality altering device to a second player at a different spatial location, and wherein objects in the set of objects comprises real objects.

12. The method of claim 10, further comprising:

in response to the detected content generation event, generating, by the processor from at least part of the set of group content preferences, a prompt to a generative model;

providing, by the processor, a content generation request comprising the prompt to the generative model; and in response to the content generation request, receiving, by the processor, the generated content generated by the generative model, wherein the prompt and received content each comprise one of text, image, music, audio, and video information, wherein the content is generated by a generative model comprising one of a variational autoencoder (VAE), generative adversarial network (GAN), autoregressive model, and transformer-based model, and wherein the prompt comprises one of a player content preference associated by a player profile with a player of the group of players, a player content preference associated with a social website posting of a player of the group of players, a game theme associated with a game, a loyalty level of a player of the group of players, and a loyalty point balance of a player of the group of players.

13. The method of claim 10, wherein each reality altering device provides a virtual reality gaming experience for each player in the group of players, wherein the sensory characteristic comprises one of a visual appearance, an auditory sound, haptic feedback, somatosensory sensation, and olfactory smell, wherein each reality altering device comprises a processor, display, sensor to sense a location or activity of a corresponding player, and input device, wherein objects in the set of objects comprises virtual objects and is free of real objects, wherein the respective portion of the selected content is different than a respective portion of the selected content presented by a second reality altering device to a second player at a different spatial location, and wherein the selected object comprises one of a virtual character, player character, a non-player character, and an inanimate virtual object.

14. The method of claim 10, wherein the detected content generation event comprises one of detection of at least a threshold level of gameplay by a player of the group of players, detection of occurrence of a predetermined state of a gaming system, detection of occurrence of a predetermined player loyalty activity by the processor, detection that gameplay on another reality altering device currently presenting different selected content is below a threshold level of gameplay, detection that a presentation duration of the different selected content is at least a threshold duration, occurrence of at least a threshold loyalty point balance or loyalty status associated with a player of the group of players, and occupancy of at least a threshold number of players of the group of players in a defined area of the gaming system and further comprising:

based on the respective locations of first and second players in the group of players relative to the respective spatial location of the selected object, causing, by the processor, a first respective portion of the selected content to be presented by a first reality altering device of the first player and a different second respective portion of the selected content to be presented by a second reality altering device of the second player.

15. The method of claim 10, further comprising:

causing, by the processor, common selected content to be incorporated into presentation of the selected object by multiple reality altering devices;

rendering, by the processor, different objects in spatial proximity to the group of players using different selected content; and based on the different first and second preferences of first and second players of the group of players, causing, by the processor, a first respective portion of the selected content to be presented by a first reality altering device of the first player and a different second respective portion of the selected content to be presented by a second reality altering device of the second player, wherein the first and second respective portions of the selected content are related to a common game theme.

16. The method of claim 10, further comprising:

based on the respective spatial locations of first and second players in the group of players relative to the respective spatial location of different first and second selected objects, causing, by the processor, first selected content to be presented by first and second reality altering devices of the first and second players, respectively, for the first selected object;

monitoring, by the processor, behavior of the first and second players in response to presentation of the first selected content; and based on monitored behavior, selecting and causing, by the processor, second selected content to be presented by the first and second reality altering devices of the first and second players, respectively, for the second selected object.

17. The method of claim 10, wherein the set of group content preferences comprises a preference regarding one of a text, image, music, audio, color, style, animation, and video information and further comprising:

determining, by the processor, the set of group content preferences by weighting a first set of player content preferences of a first player of the group of players more than a second set of player content preferences of a second player of the group of players, and wherein the selecting the content in the generated content comprises determining, by the processor, a relatedness of the generated content against a current game theme of a game.

18. The method of claim 12, further comprising:

determining, by the processor, whether a selected player in the group of players is eligible to have a corresponding set of preferences included in the prompt;

associating, by the processor, a game or session identifier associated with game played by the group of players while the selected content is presented by the reality altering devices to the group of players and gameplay information associated with a played game with a content identifier associated with the selected content and an object identifier associated with the selected content; and applying, by the processor, a set of rules in selecting a virtual object from a set of virtual objects, the set of rules comprising one of a location of the object relative to a physical structure, content blacklist rules, whitelist rules, a level of occupancy of other players in spatial proximity to the group of players, an age of a selected player in the group of players, a player loyalty level of the selected player and player accessibility to a desired spatial location.

19. A method, comprising:

detecting, by a processor, a content generation event;

determining, by the processor, a set of group content preferences based on different sets of player content preferences associated with different players in a group of players;

in response to the detected content generation event, generating, by the processor from at least part of the set of group content preferences, a prompt to a generative model;

providing, by the processor, a content generation request comprising the prompt to the generative model; and in response to the content generation request, receiving, by the processor, generated content generated by the generative model;

applying, by the processor, a set of rules in selecting generated content and a virtual object from a set of virtual objects, the set of rules comprising one of a location of the virtual object relative to a physical structure, content blacklist rules defining blacklisted content, content whitelist rules defining whitelisted content, a level of occupancy of other players in spatial proximity to the group of players, an age of a selected player in the group of players, a player loyalty level of the selected player, and player accessibility to a desired spatial location;

determining, by the processor relative to a three-dimensional coordinate system, a respective spatial location of each player in the group of players and a respective spatial location of the selected virtual object; and based on the respective spatial location of each player in the group of players relative to the respective spatial location of the selected virtual object, causing, by the processor, at least a portion of the selected generated content to be presented by one of an augmented reality and virtual reality output device to represent a sensory characteristic of the selected virtual object.

20. The method of claim 15, wherein the generative model comprises one of a variational autoencoder (VAE), generative adversarial network (GAN), autoregressive model, and transformer-based model, wherein the prompt comprises one of a content preference associated by a player profile with a player of the group of players, a content preference associated with a social website posting of a player of the group of players, a content preference received from a mobile device of a player of the group of players, a loyalty level of a player of the group of players, and a loyalty point balance of a player of the group of players, wherein the detected content generation event comprises one of: detection of at least a threshold level of gameplay by a player of the group of players, detection of occurrence of a predetermined state of a gaming system, detection of occurrence of a predetermined player loyalty activity by the processor, detection that gameplay on another reality altering device currently presenting different selected content is below a threshold level of gameplay, detection that a presentation duration of the different selected content is at least a threshold duration, occurrence of a predetermined random or pseudorandom number, and occurrence of at least a threshold loyalty point balance or loyalty status associated with a player of the group of players, and further comprising:

parsing one of received input of a player and the received generated content for malicious content for malicious content, wherein the malicious content comprises one of a quick response ("QR") code, malware, and content violating a game rule.

* * * * *